United States Patent
Smith

(10) Patent No.: US 8,935,786 B2
(45) Date of Patent: Jan. 13, 2015

(54) SYSTEMS AND METHODS FOR DYNAMICALLY CHANGING NETWORK STATES

(75) Inventor: Wayne B. Smith, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/461,042

(22) Filed: May 1, 2012

(65) Prior Publication Data

US 2013/0298235 A1 Nov. 7, 2013

(51) Int. Cl.
  *G06F 11/00* (2006.01)
  *H04L 29/06* (2006.01)
  *H04L 12/24* (2006.01)

(52) U.S. Cl.
  CPC ............ *H04L 63/14* (2013.01); *H04L 41/0886* (2013.01)
  USPC .............................. 726/23; 709/222; 709/221

(58) Field of Classification Search
  CPC ............ H04L 63/1416; H04L 63/1408; H04L 63/1441; H04L 63/1458; H04L 63/20; H04L 63/0414; H04L 63/0209; H04L 63/0272; H04L 41/12; H04L 41/0886; H04L 41/0893; H04L 41/0803; H04L 61/00; H04L 45/028
  See application file for complete search history.

(56) References Cited

U.S. PATENT DOCUMENTS

| | | |
|---|---|---|
| 5,734,649 A | 3/1998 | Carvey et al. |
| 6,052,064 A | 4/2000 | Budnik et al. |
| 6,646,989 B1 | 11/2003 | Khotimsky et al. |
| 6,917,974 B1 | 7/2005 | Stytz et al. |
| 6,981,146 B1 | 12/2005 | Sheymov |
| 7,010,604 B1 | 3/2006 | Munger et al. |
| 7,043,633 B1 | 5/2006 | Fink et al. |
| 7,085,267 B2 | 8/2006 | Carey et al. |
| 7,133,930 B2 | 11/2006 | Munger et al. |

(Continued)

FOREIGN PATENT DOCUMENTS

JP 2008177714 A 7/2008

OTHER PUBLICATIONS

Shi, L., et al., "Full Service Hopping for Proactive Cyber-Defense", International Conference on Networking, Sensing and Control, 2008. ICNSC 2008, IEEE, Apr. 6-8, 2008.

(Continued)

*Primary Examiner* — Eleni Shiferaw
*Assistant Examiner* — Gregory M Elmore
(74) *Attorney, Agent, or Firm* — Fox Rothschild LLP; Robert J. Sacco, Esq.

(57) ABSTRACT

Systems and methods for use in a Computer Network ("CN"). The methods involve performing operations by a first sub-network in accordance with a first Mission Plan ("MP") specifying a first process for pseudo-randomly modifying at least one first identity parameter associated with at least one first computing device of CN to specify false information. Operations are also performed by a second sub-network in accordance with a second MP specifying a second process for pseudo-randomly modifying at least one second identity parameter associated with at least one second computing device of CN to specify false information. A functional topology of the first and/or second sub-networks is selectively determined based at least one MP. The functional topology specifies the manner in which nodes of the sub-networks are to be communicatively isolated from each other so as to create an appearance of two disparate and separate networks.

17 Claims, 21 Drawing Sheets

(56) References Cited

U.S. PATENT DOCUMENTS

| | | | |
|---|---|---|---|
| 7,216,359 B2 | 5/2007 | Katz et al. | |
| 7,236,598 B2 | 6/2007 | Sheymov et al. | |
| 7,382,778 B2 | 6/2008 | Chari et al. | |
| 7,469,279 B1* | 12/2008 | Stamler et al. | 709/221 |
| 7,712,130 B2 | 5/2010 | Reamer | |
| 7,739,497 B1 | 6/2010 | Fink et al. | |
| 7,756,140 B2 | 7/2010 | Matoba | |
| 7,757,272 B1 | 7/2010 | Dean | |
| 7,787,476 B2 | 8/2010 | Shimizu et al. | |
| 7,895,348 B2 | 2/2011 | Twitchell, Jr. | |
| 7,958,556 B2 | 6/2011 | Roesch et al. | |
| 7,996,894 B1 | 8/2011 | Chen et al. | |
| 8,139,504 B2 | 3/2012 | Mankins et al. | |
| 8,199,677 B1 | 6/2012 | Amis et al. | |
| 8,464,334 B1 | 6/2013 | Singhal | |
| 8,572,717 B2 | 10/2013 | Narayanaswamy | |
| 2002/0010799 A1 | 1/2002 | Kubota et al. | |
| 2002/0161884 A1 | 10/2002 | Munger et al. | |
| 2002/0161905 A1 | 10/2002 | Haverinen et al. | |
| 2003/0149783 A1 | 8/2003 | McDaniel | |
| 2004/0103205 A1 | 5/2004 | Larson et al. | |
| 2004/0255167 A1 | 12/2004 | Knight | |
| 2005/0038708 A1 | 2/2005 | Wu | |
| 2005/0235044 A1 | 10/2005 | Tazuma | |
| 2006/0121418 A1 | 6/2006 | DeMarco et al. | |
| 2007/0058540 A1 | 3/2007 | Kay | |
| 2007/0073838 A1 | 3/2007 | Shizuno | |
| 2007/0081541 A1 | 4/2007 | Umekage et al. | |
| 2007/0261112 A1 | 11/2007 | Todd et al. | |
| 2008/0056487 A1 | 3/2008 | Akyol et al. | |
| 2008/0140847 A1 | 6/2008 | Almog | |
| 2008/0159128 A1 | 7/2008 | Shaffer et al. | |
| 2008/0172739 A1 | 7/2008 | Nakae et al. | |
| 2008/0205399 A1 | 8/2008 | Delesalle et al. | |
| 2008/0222734 A1 | 9/2008 | Redlich et al. | |
| 2008/0235755 A1 | 9/2008 | Blaisdell et al. | |
| 2008/0313348 A1 | 12/2008 | Morris et al. | |
| 2009/0031042 A1 | 1/2009 | Phatak | |
| 2009/0059788 A1 | 3/2009 | Granovsky et al. | |
| 2009/0106439 A1 | 4/2009 | Twitchell, Jr. | |
| 2009/0165116 A1 | 6/2009 | Morris | |
| 2010/0009758 A1 | 1/2010 | Twitchell, Jr. | |
| 2010/0229241 A1 | 9/2010 | Liu et al. | |
| 2010/0246823 A1 | 9/2010 | Xiao et al. | |
| 2010/0274923 A1* | 10/2010 | Dean | 709/238 |
| 2010/0322391 A1 | 12/2010 | Michaelis et al. | |
| 2010/0333188 A1 | 12/2010 | Politowicz | |
| 2011/0016210 A1 | 1/2011 | Underwood | |
| 2011/0179136 A1 | 7/2011 | Twitchell, Jr. | |
| 2011/0277032 A1 | 11/2011 | Vargas | |
| 2012/0117376 A1 | 5/2012 | Fink et al. | |
| 2012/0201138 A1* | 8/2012 | Yu et al. | 370/235 |
| 2012/0303616 A1 | 11/2012 | Abuelsaad et al. | |
| 2013/0104228 A1 | 4/2013 | Burnham et al. | |

OTHER PUBLICATIONS

Kewley, D., et al., "Dynamic Approaches to Thwart Adversary Intelligence Gathering," pp. 176-185, 0-7695-1212-7/01 2001 IEEE.

Beraud, P., et al., "Cyber Defense Network Maneuver Commander", 978-1-4244-7402-8/10 2010 IEEE.

Levin, D., "Lessons Learned in Using Live Red Teams in IA Experiments", Retrieved from the Internet <URL:http://www.bbn.com/resources/pdf/RedTeamExptsPaper-Levin10-02.pdf>>, [retrieved on Apr. 9, 2012].

Kewley et al., Dynamic Approach to thwart adversary intelligence gathering, 2001, IEEE, 176-185 vol. 1.

Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].

International Search Report mailed Apr. 29, 2013, Application Serial No. PCT/US2013/023700 in the name of Harris Corporation.

Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, p. 183-192.

Information about Related Patents and Patent Applications, see section 6 of the accompanying Information Disclosure Statement Letter, which concerns Related Patents and Patent Applications.

Masking Networks, Inc. "MS-200 Network Masking Capabilities", Jun. 2010.

Zhao, C., Jia, C., & Lin, K. (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.

Repik, K.A. "Defeating Adversary Network Intelligence Efforts with Active Cyber Defense Techniques", Degree of Master of Cyber Warfare, Jun. 1, 2008, XP55004366, Retrieved from the Internet: URL: <http://www.dtic.mii/ogi-bin/GetTRDoc?A> D=ADA488411 &Location=U2&doc=GetTRDoc.pdf [retrieved on Aug. 9, 2011].

International Search Report mailed Mar. 3, 2014, Application Serial No. PCT/US2013/038557 in the name of Harris Corporation.

* cited by examiner

SYSTEMS AND METHODS FOR DYNAMICALLY CHANGING NETWORK STATES

BACKGROUND OF THE INVENTION

1. Statement of the Technical Field

The inventive arrangements relate to computer network security, and more particularly to systems for communicating between two or more logical subdivisions of a computer network where the network is dynamically maneuverable to defend against malicious attacks.

2. Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency ("DARPA") Information Assurance ("IA") Program has performed initial research in the area of dynamic network defense. A technique was developed under the IA program to dynamically reassign Internet protocol ("IP") address space feeding into a pre-designated network enclave for the purpose of confusing any would-be adversaries observing the network. This technique is called DYnamic Network Address Transformation ("DYNAT"). An overview of the DYNAT technology was presented in a paper by DARPA entitled "Dynamic Approaches to Thwart Adversary Intelligence" which was published in 2001.

SUMMARY OF THE INVENTION

Embodiments of the present invention concern systems and methods for use in a computer network. The methods involve performing operations by a first sub-network of the computer network in accordance with a first mission plan. The first mission plan specifies a first process for pseudo-randomly modifying at least one first identity parameter associated with at least one first computing device of the computer network to specify false information. Operations are also performed by a second sub-network of the computer network in accordance with a second mission plan. The second mission plan specifies a second process for pseudo-randomly modifying at least one second identity parameter associated with at least one second computing device of the computer network to specify false information. The second mission plan is different than the first mission plan. A functional topology of the first and/or second sub-networks is selectively determined based on the first mission plan and/or the second mission plan. The functional topology specifies the manner in which nodes of the first and second sub-networks are to be communicatively isolated from each other so as to create an appearance of two disparate and separate networks.

During operations of the first and second sub-networks, a first event is detected for triggering a change in a state of the computer network. The first event can include, but is not limited to, a user-software interaction commanding a change of the state or an expiration of a pre-defined period of time. In response to the detection of the first event, the state of the computer network is modified. In this regard, a sub-network architecture of the computer network and/or a mission plan implemented by the computer network is changed. Notably, the sub-network architecture is changed without physical modification of the computer network.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Identity Agile Computer Network

Figure 1:
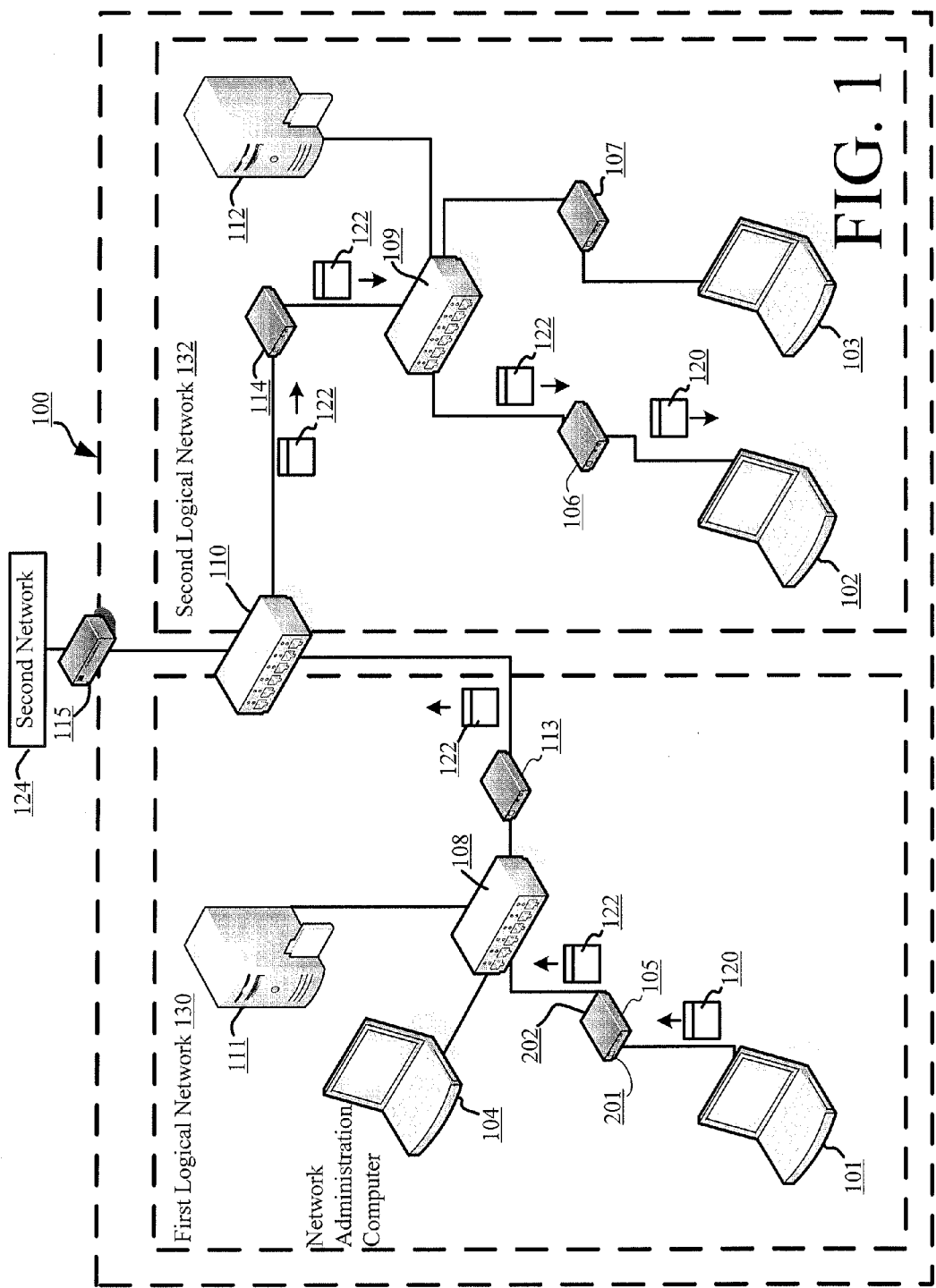
FIG. 1 is an example of a computer network that is useful for understanding the present invention.

Referring now to FIG. 1, there is shown a diagram of an exemplary computer network 100 which includes a plurality of computing devices. The computing devices can include client computers 101-103, NAC 104, servers 111, 112, network layer 2 switches 108, 109, layer 3 switch 110, and a bridge 115. The client computers 101-103 can be any type of computing device which might require network services, such as a conventional tablet, notebook, laptop or desktop computer. The layer 3 switch 110 can be a conventional routing device that routes data packets between computer networks. The layer 2 switches 108, 109 are conventional hub devices (e.g., an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the computer network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The computer network 100 in FIG. 1 can use any communication protocol or combination of protocols which is now known or known in the future. For example, the computer network 100 can use the well known Ethernet protocol suite for such communications. Alternatively, the computer network 100 can make use of other protocols, such as the protocols of an internet protocol suite (often referred to as the TCP/IP suite), Synchronous Optical NETwork/Synchronous Digital Hierarchy ("SONET/SDH") based protocols, or Asynchronous Transfer Mode ("ATM") communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

The invention generally concerns a method for communicating data in a computer network (e.g., in computer network 100), where data is communicated from a first computing device to a second computing device. Computing devices within the network are represented with multiple identity parameters. The phrase "identity parameters", as used herein, can include items such as an IP address, a Media Access Control ("MAC") address, a port number and so on. However, the invention is not limited in this regard, and the identity parameters can also include a variety of other information which is useful for characterizing a network node. The various types of identity parameters contemplated herein are discussed below in further detail.

The inventive arrangements involve the use of MTT to manipulate one or more of such identity parameters for one or more computing devices within the computer network 100. This technique disguises communication patterns and network addresses of such computing devices. The manipulation of identity parameters as described herein is generally performed in conjunction with data communications in the computer network 100, i.e., when data is to be communicated from a first computer in the network (e.g., client computer 101) to a second computer in the network (e.g., client computer 102). Accordingly, the identity parameters that are manipulated can include those of a source computing device (i.e., the device from which the data originated) and the destination computing device (i.e., the device to which the data is being sent). The set of identity parameters that is communicated is referred to herein as an IDentity Parameter ("IDP") set. This concept is illustrated in FIG. 1, which shows that an IDP set 120 is transmitted by client computer 101 as part of a data packet (not shown).

The process according to the inventive arrangements involves selectively modifying at a first location within the computer network 100, values contained in a data packet or datagram which specify one or more identify parameters of a source computing device and/or a destination computing device. The identity parameters are modified in accordance with a mission plan. The location where such modification is performed will generally coincide with the location of one module 105-107, 113, 114 of the computer network 100. Referring once again to FIG. 1, it can be observed that the modules 105-107, 113, 114 are interposed in the computer network 100 between the various computing devices which comprise nodes in such network. In these locations, the modules 105-107, 113, 114 intercept data packet communications, perform the necessary manipulations of identity parameters, and retransmit the data packets along a transmission path. In alternative embodiments, the modules 105-107, 113, 114 can perform a similar function, but can be integrated directly into one or more of the computing devices. For example, the modules could be integrated into client computers 101, 102, 103, servers 111, 112, layer 2 switches 108, 109 and/or layer 3 switch 110. In this scenario, the modules can comprise hardware that is added to the computing and/or software that is installed on the computing device 101-103, 108-112. In some software embodiments, the modules are implemented as kernel mode software (e.g., as device drivers) that modifies the identity parameters.

Additionally, the computer network 100 can be divided into a number of logical subdivisions, sometimes referred to as sub-networks or subnets, connected through layer 3 switch 110. An enterprise network can be divided into a number of subnets for a variety of administrative or technical reasons including, but not limited to, hiding the topology of the network from being visible to external hosts, connecting networks utilizing different network protocols, separately administering network addressing schemes on the subnet level, enabling management of data traffic across subnets due to constrained data connections, and the like. Subnetting is well known in the art and will not be described in further detail.

Referring again to FIG. 1, the computer network 100 is divided into two logical networks, namely a first logical network 130 and a second logical network 132. The phrase "logical network", as used herein, refers to any logical subdivision of a computer network. In an embodiment, logical networks 130, 132 are connected through layer 3 switch 110. Layer 3 switch 110 is responsible for directing traffic between the logical networks (i.e., from client computer 101 to client computer 103). Layer 3 switch 110 is also responsible for directing traffic from any host connected to the computer network 100 bound for a second network 124. In the embodiment shown in FIG. 1, traffic routed from the computer network 100 to the second network 124 passes through bridge 115. As with the modules above, the functionality of the bridge 115 could be integrated within the layer 3 switch 110.

Figure 2:
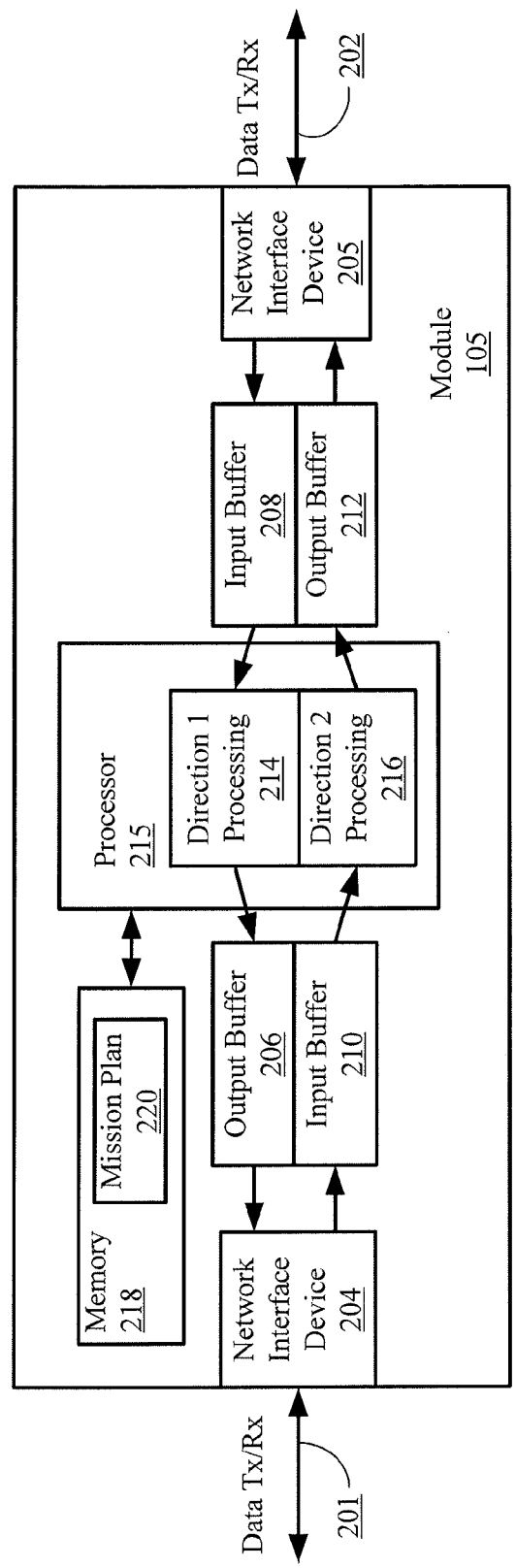
FIG. 2 is an example of a module that can be used in the present invention for performing certain manipulations of identity parameters.

An example of a functional block diagram of a module 105 is shown in FIG. 2. Modules 106, 107, 113, 114 of FIG. 1 can have a similar functional block diagram as that shown in FIG. 2, but it should be understood that the invention is not limited in this regard. As shown in FIG. 2, the module 105 has at least two data ports 201, 202, each of which can correspond to a respective network interface device 204, 205. Data received at data port 201 is processed at network interface device 204 and temporarily stored at an input buffer 210. The processor 215 accesses the input data packets contained in input buffer 210 and performs any necessary manipulation of identity parameters as described herein. The modified data packets are passed to output buffer 212 and subsequently transmitted from data port 202 using network interface device 205. Similarly, data received at data port 202 is processed at network interface device 205 and temporarily stored at an input buffer 208. The processor 215 accesses the input data packets contained in input buffer 208 and performs any necessary manipulation of identity parameters as described herein. The modified data packets are passed to an output buffer 206 and subsequently transmitted from data port 201 using network interface device 204. In module 105, manipulation of identity parameters is performed by processor 215 in accordance with a mission plan 220 stored in a memory 218.

It will be understood from FIG. 2 that the module 105 is preferably configured so that it operates bi-directionally. In such embodiments, the module 105 can implement different modification functions, depending on a source of a particular data packet. The dynamic modification function in the module 105 can be specified in the mission plan in accordance with a source computing device of a particular data packet. The module 105 can determine a source of data packets by any suitable means. For example, a source address of a data packet can be used for this purpose.

During operation, the processor 215 will determine one or more false identity parameter values that are to be used in place of the true identity parameter values. The processor 215 will transform one or more true identity parameter values to one or more false identity parameter values which are preferably specified by a pseudorandom function. Following this transformation, the module 105 will forward the modified packet or datagram to the next node of the computer network 100 along a transmission path. At subsequent points in the communication path, an adversary who is monitoring such network communications will observe false or incorrect information about the identity of computing devices communicating on the computer network 100.

In a preferred embodiment, the false identity parameters that are specified by the pseudorandom function are varied in accordance with the occurrence of at least one proactive trigger event or at least one reactive trigger event. A proactive/reactive trigger event causes the processor 215 to use the pseudorandom function to generate a new set of false identity parameter values into which the true identity parameters are transformed. Accordingly, the proactive/reactive trigger event serves as a basis for the dynamic variation of the false identity parameters described herein. Proactive and reactive trigger events are discussed in more detail below. However, it should be noted that proactive/reactive trigger events for selecting a new set of false values for identity parameters can be based on at least one pre-defined rule. The rule comprises a statement that defines at least one proactive or reactive trigger event. In this regard, the user rule may implement a proactive triggering scheme or a reactive triggering scheme. A proactive triggering scheme comprises a time based scheme. A reactive triggering scheme comprises a user activation based scheme, a packet inspection based scheme, congestion level based scheme, a heuristic algorithm based scheme and/or a Network-Based Attack ("NBA") analysis based scheme. Each of the listed schemes will be described in detail below.

The transformation of identity parameters described above provides one way to maneuver a computer network 100 for purposes of thwarting a cyber attack. In a preferred embodiment, the mission plan 220 implemented by processor 215 will also control certain other aspects of the manner in which computer network 100 can maneuver. For example, the mission plan 220 can specify that a dynamic selection of identity parameters is manipulated. The dynamic selection can include a choice of which identity parameters are selected for modification, and/or a number of such identity parameters that are selected. This variable selection process provides an added dimension of uncertainty or variation which can be used to further thwart an adversary's effort to infiltrate or learn about a computer network 100. As an example of this technique, consider that during a first time period, the module 105 can modify a destination IP address and a destination MAC address of each data packet. During a second time period, the module 105 could manipulate the source IP address and a source host name in each data packet. During a third period of time, the module 105 could manipulate a source port number and a source user name. Changes in the selection of identity parameters can occur synchronously (i.e., all selected identity parameters are changed at the same time). Alternatively, changes in the selection of identity parameters can occur asynchronously (i.e., the group of selected identity parameters changes incrementally as individual identity parameters are added or removed from the group of selected identity parameters).

A pseudorandom function is preferably used for determining the selection of identity values that are to be manipulated or transformed into false values. In other words, the module 105 will transform only the identity parameters selected by the pseudo-random function. In a preferred embodiment, the selection of identity parameters that are specified by the pseudorandom function is varied in accordance with the occurrence of a proactive/reactive trigger event. The proactive/reactive trigger event causes processor 215 to use a pseudorandom function to generate a new selection of identity parameters which are to be transformed into false identity parameters. Accordingly, the proactive/reactive trigger event serves as a basis for the dynamic variation of the selection of identity parameters described herein. Notably, the values of the identity parameters can also be varied in accordance with a pseudorandom algorithm.

The module 105 is advantageously capable of also providing a third method of maneuvering the computer network for purposes of thwarting a cyber attack. Specifically, the mission plan 220 loaded in module 105 can dynamically vary the location within the network where the modification or transformation of the identity parameters takes place. Consider that modification of identity parameters in an IDP set 120 sent from client computer 101 to client computer 102 could occur in module 105. This condition is shown in FIG. 1, where the identity parameters contained in IDP set 120 are manipulated in module 105 so that the IDP set 120 is transformed to a new or modified IDP set 122. At least some of the identity parameters in the IDP set 122 are different as compared to the identity parameters in the IDP set 120. But, the location where such transformation occurs is preferably also controlled by the mission plan. Accordingly, manipulation of the IDP set 120 could, for example, sometimes occur at module 113 or 114 of FIG. 1, instead of at module 105. This ability to selectively vary the location where manipulation of identity parameters occurs adds a further important dimension to the maneuvering capability of the computer network 100.

The dynamic variation in the location where identity parameters are modified is facilitated by selectively controlling an operating state of each module 105-107, 113, 114 of FIG. 1. To that end, the operational states of each module 105-107, 113, 114 of FIG. 1 preferably includes (1) an active state in which data is processed in accordance with a current mission plan, and (2) a by-pass state in which packets can flow through the module as if the module was not present. The location where the dynamic modification is performed is controlled by selectively causing certain modules of the computer network 100 to be in an active state and certain modules of the computer network 100 to be in a standby state. The location can be dynamically changed by dynamically varying the current state of the modules 105-107, 113, 114 of FIG. 1 in a coordinated manner.

The mission plan 220 can include a predefined sequence for determining the locations within the computer network 100 where the identity parameters are to be manipulated. Locations where identity parameters are to be manipulated will change in accordance with the predefined sequence at times indicated by a proactive/reactive trigger event. For example, the proactive/reactive trigger event can cause a transition to a new location for manipulation or transformation of identity parameters as described herein. Accordingly, the proactive/reactive trigger event serves as a basis for the occurrence of a change in the location where identity parameters are modified, and the predefined sequence determines where the new location will be.

From the foregoing, it will be appreciated that a data packet is modified at a module 105-107, 113, 114 of FIG. 1 to include false identity parameters. At some point within the computer network 100, it is necessary to restore the identity parameters to their true values, so that the identity parameters can be used to properly perform their intended function in accordance with the particular network protocol. Accordingly, the inventive arrangements also includes dynamically modifying, at a second location (i.e., a second module), the assigned values for the identity parameters in accordance with the mission plan 220. The modification at the second location essentially comprises an inverse of a process used at the first location to modify the identity parameters. The module at the second location can thus restore or transform the false value identity parameters back to their true values. In order to accomplish this action, the module at the second location must be able to determine at least (1) a selection of identity parameter value that are to be transformed, and (2) a correct transformation of the selected identity parameters from false values to true values. In effect, this process involves an inverse of the pseudorandom process or processes used to determine the identity parameter selection and the changes effected to such identity parameter values. The inverse transformation step is illustrated in FIG. 1, where the IDP set 122 is received at module 106, and the identity parameter values in IDP set 122 are transformed or manipulated back to their original or true values. In this scenario, module 106 converts the identity parameters values back to those of IDP set 120.

Notably, a module must have some way of determining the proper transformation or manipulation to apply to each data communication it receives. In a preferred embodiment, this determination is performed by examining at least a source address identity parameter contained within the received data communication. For example, the source address identity parameter can include an IP address of a source computing device. Once the true identity of the source computing device is known, the module consults the mission plan (or information derived from the mission plan) to determine what actions it needs to take. For example, these actions could include converting certain true identity parameter values to false identity parameter values. Alternatively, these changes could include converting false identity parameter values back to true identity parameter values.

Notably, there will be instances where the source address identity parameter information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address identity parameter value to a Look-Up-Table ("LUT") which lists all such false source address identity parameter values in use during a particular time. The LUT also includes a list of true source address identity parameter values that correspond to the false source address values. The LUT can be provided directly by the mission plan 220 or can be generated by information contained within the mission plan 220. In either case, the identification of a true source address identity parameter value can be easily determined from the LUT. Once the true source address identity parameter has been determined, then the module which received the data communication can use this information to determine (based on the mission plan) what manipulations to the identity parameters are needed.

Notably, the mission plan 220 can also specify a variation in the second location where identity parameters are restored to their true values. For example, assume that the identity parameters are dynamically modified at a first location comprising module 105. The mission plan can specify that the restoration of the identity parameters to their true values occurs at module 106 as described, but can alternatively specify that dynamic modification occur instead at module 113 or 114. In some embodiments, the location where such manipulations occur is dynamically determined by the mission plan in accordance with a predefined sequence. The predefined sequence can determine the sequence of locations or modules where the manipulation of identity parameters will occur.

The transition involving dynamic modification at different locations preferably occurs in accordance with a proactive/ reactive trigger event. Accordingly, the predefined sequence determines the pattern or sequence of locations where data manipulations will occur, and the proactive/reactive trigger event serves as a basis for causing the transition from one location to the next. Proactive/reactive trigger events are discussed in more detail below; however, it should be noted that proactive/reactive trigger events can be based on at least one pre-defined rule. The rule comprises a statement that defines at least one proactive/reactive trigger event. In this regard, the rule may implement proactive triggering schemes or reactive triggering schemes. A proactive triggering scheme comprises a time based scheme. A reactive triggering scheme comprises a user activation based scheme, a packet inspection based scheme, a congestion level based scheme, a heuristic algorithm based scheme and/or an NBA analysis based scheme. Each of the listed schemes will be described below in detail. Control over the choice of a second location (i.e., where identity parameters are returned to their true values) can be effected in the same manner as described above with regard to the first location. Specifically, operating states of two or more modules can be toggled between an active state and a bypass state. Manipulation of identity parameters will only occur in the module which has an active operating state. The module with a bypass operating state will simply pass data packets without modification.

Alternative methods can also be used for controlling the location where manipulation of identity parameters will occur. For example, a network administrator can define in a mission plan several possible modules where identity parameters can be converted from true values to false values. Upon the occurrence of a proactive/reactive trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time (such as a GPS time or system clock time). In this way, each module can independently determine whether it is currently an active location where manipulation of identity parameters should occur. Similarly, the network administrator can define in a mission plan several possible modules where dynamic manipulation returns the identity parameters to their correct or true values. The selection of which module is used for this purpose can also be determined in accordance with a trigger time and a pseudorandom function as described herein. Other methods are also possible for determining the location or module where identity parameter manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different positions for the first and second locations within the network can have the effect of changing the number of nodes between the first and second locations. For example, in FIG. 1, the dynamic modification of identity parameters are implemented in selected ones of the modules 105, 106, 107, 113, 114. The modules actually used to respectively implement the dynamic modification is determined as previously described. If module 105 is used for converting identity parameters to false values and module 106 is used to convert them back to true values, then there are three network nodes (108, 110, 109) between modules 105 and 106. But if module 113 is used to convert to false values and module 114 is used to convert the identity parameters back to true values, then there is only one network node 110 between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present invention, the manipulation of identity parameter values, the selection of identity parameters, and the locations where these identity parameters is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present invention, either can be used, and the two are considered equivalent. In some embodiments, the same pseudorandom process can be used for dynamically varying two or more of the maneuvering parameters. However, in a preferred embodiment of the invention, two or more different pseudorandom processes are used so that two or more of these maneuvering parameters are modified independently of the others.

Proactive and Reactive Trigger Events

As noted above, the dynamic changes to each of the maneuvering parameters is controlled by at least one proactive trigger or reactive trigger. A proactive trigger is a pre-defined event that causes a change to occur in relation to the dynamic modifications described herein. In contrast, a reactive trigger is a purely spontaneous or user initiated event that causes a change to occur in relation to the dynamic modifications described herein. Stated differently, it can be said that the proactive or reactive trigger causes the network to maneuver in a new way that is different than at a previous time (i.e., before the occurrence of the proactive or reactive trigger). For example, during a first period of time, a mission plan or security model can cause an IP address to be changed from value A to value B; but after the proactive/reactive trigger event, the IP address can instead be changed from value A to value C. Similarly, during a first period of time a mission plan or security model can cause an IP address and a MAC address to be modified; but after the proactive/reactive trigger event, the mission plan or security model can instead cause a MAC address and a user name to be modified.

In its simplest form a proactive trigger event can be based on a time based scheme. In a time based scheme, a clock time in each module could serve as a trigger. For example, a trigger event could be defined as occurring at the expiration of every N (e.g., sixty) second time interval. For such an arrangement, one or more of the maneuvering parameters could change every N seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false identity parameter values could be changed at time interval X, a selection of identity parameters would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized identity parameters. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

In its simplest form a reactive trigger can be based on a user activation based scheme, a packet inspection based scheme, a congestion level based scheme, a heuristic algorithm based scheme and/or an NBA analysis based scheme. In the user activation based scheme, a user-software interaction defines a trigger event. For example, a trigger event occurs when a user of a computing device (e.g., computing device 101-103 of FIG. 1) depresses a given button of a user interface.

The packet inspection based scheme can involve analyzing a packet to obtain an identifier identifying an origin of the packet, a destination of the packet, a group to which the origin or destination belong, and/or a type of payload contained in the packet. The packet inspection based scheme can also involve analyzing the packet to determine whether a code word is contained therein. Techniques for achieving such a packet inspection are well known in the art. Any such technique that is now known or known in the future can be used with the present invention without limitation. In some embodiments, a reactive trigger event occurs when a value of the identifier matches a predefined value.

In the packet inspection scenarios, the inclusion of a particular type of content in a packet serves as a trigger or as a parameter for selecting a timing scheme on which a trigger is based. For example, a trigger event could be defined as occurring (a) when a particular person of an entity (e.g., a commander of a military unit) communicates information to other members of the entity, and/or (b) when a particular code word is contained within the packet. Alternatively or additionally, a trigger event could be defined as occurring at the expiration of every N second time interval as defined by a timing scheme selected in accordance with a particular packet inspection application, where N is an integer. In this regard, it should be understood that in some embodiments a first timing scheme can be selected (a) when a first person of an entity (e.g., a commander of a military unit) requests a communication session with other members of the entity or (b) when a particular code word exists within a packet. A second different timing scheme can be selected (a) when a second person of an entity (e.g., a lieutenant commander of a military unit) requests a communication session with other members of the entity or (b) when a second code word exits within a packet, and so on. Embodiments of the present invention are not limited to the particularities of the above provided examples. In this regard, it should be understood that other content included in a packet can define a trigger event. For example, if the payload of a packet includes sensitive or confidential information, then a new mission plan or security model can be selected in accordance with the level of sensitivity or confidentiality of said information.

For such time-based trigger arrangements, one or more of the maneuvering parameters could change every N (e.g., 60) seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false identity parameter values could be changed at time interval X, a selection of identity parameters would change in accordance with a time interval Y, and a location where such changes are performed would occur at time interval Z, where X, Y and Z are different values.

The congestion level based scheme can involve: monitoring and tracking the level of congestion within a computer network; comparing a current level of congestion with a threshold value; and selecting a mission plan or security model from a plurality of mission plans/models based on the results of the comparison. In some scenarios, a new mission plan or security model is selected when the current level of congestion is equal to, greater than or less than the threshold value. In this way, a mission plan or security model change occurs at apparently erratic time intervals based on changes in the level of congestion within a computer network.

The heuristic algorithm based scheme can involve analyzing a network to determine a state thereof. Such a network analysis can involve monitoring traffic patterns (e.g., the number of users), protocol patterns, and/or entropy patterns (i.e., who is communicating with who) of a network at particular times of a day. A traffic pattern can be determined by collecting information about network equipment usage (e.g., a processor's usage) and a number of connections that exist from a network device (e.g., a network server). The collected information can be compared against the contents of a pre-defined table or matrix to identify which of a plurality of possible traffic patterns currently exists within a computer network. Based at least on the results of this comparison operation, a new mission plan or security model can be selected from a plurality of mission plans and/or security models for utilization in the computer network.

In some heuristic scenarios, the mission plans and/or security models can be configured such that a constant high level of traffic is maintained within a computer network despite changes in the amount of actual traffic therein. The constant high level of traffic is maintained by adjusting (i.e., increasing or decreasing) a noise level of a network in accordance with the amount of actual traffic therein. Consequently, the amount of actual traffic and the type of traffic pattern at any given time is masked.

A protocol pattern can be determined by collecting information about user activities related to network resources. Such information can include, but is not limited to, a history of user activities for at least one user of a computer network, times that user activities start, times that user activities stop, times that user activities have elapsed, and information identifying concurrent user activities being performed by at least one user of a computer network. The collected information can be analyzed to determine if a certain protocol pattern currently exists. If it is determined that a particular protocol pattern currently exists, then a new mission plan or security model can be selected from a plurality of mission plans/models for utilization in the computer network. In this way, a mission plan or security model change occurs at apparently erratic time intervals based on changes in protocol patterns (more particularly, changes in user activities).

The entropy pattern can be determined by collecting information about who is communicating with each other over the computer network. Based on the collected information, a new mission plan or security model is selected from a plurality of mission plans/models for utilization in the computer network. In this scenario, a mission plan or security model change occurs at apparently erratic time intervals based on changes of the parties participating in communication sessions.

The NBA analysis is performed for purposes of determining a potential security threat, the level of an NBA, a type of an NBA, and/or the number of NBA attacks currently being waged on a computer network. Such NBA analyses are well known in the art, and therefore will not be described herein. Still, it should be understood that such NBA analyses can involve: monitoring and tracking attack events within a computer network; and performing LUT operations for purposes of: determining if there is a potential security threat; and/or determining the level of an NBA attack and/or the type of an NBA attack. Any NBA analysis technique that is now known or known in the future can be used with the present invention without limitation. Once the NBA analysis is completed, a new mission plan or security model can be selected from a plurality of mission plans/models for utilization in the computer network based on the results of the NBA analysis. For example, if it has been determined that an NBA is a low level NBA and/or is of a first type, then a first mission plan or security model is selected from a plurality of mission plans or security models. In contrast, if it has been determined that the NBA is a high level NBA and/or is of a second type, then a second different mission plan or security model is selected from the plurality of mission plans or security models. In this scenario, a mission plan or security model change occurs at apparently erratic time intervals based on changes in the level of NBA attacks and/or the types of NBA attacks. Additionally or alternatively, a new mission plan or security model can be selected when two or more NBA attacks of the same or different levels and/or types are currently being waged on the computer network. In this scenario, a mission plan or security model change occurs at apparently erratic time intervals based on changes in the number of attacks currently being performed.

In embodiments of the present invention, an NBA can be identified by a network security software suite. Alternatively, the NBA can be identified upon the receipt of a data packet at a module 105, 106, 107, 113, 114 where the packet contains one or more identity parameters that are inconsistent with the present state of network maneuvering. Regardless of the basis for identifying an NBA, the existence of such NBA can serve as a reactive trigger event as described above.

Proactive/reactive trigger events based on the above described schemes can cause the same types of network maneuvers. For example, false identity parameters, the selection of identity parameters and the locations of identity parameter transformations could remain stable (i.e., unchanged) except in the case where one or more of the following is detected: a clock time; a packet having a particular origin or destination; a code word contained in a packet; secret or confidential information contained in a packet; a particular level of congestion; a particular traffic pattern; a particular protocol pattern; a particular entropy pattern; a security threat; an NBA of a particular level and/or type; and a particular number of NBAs currently being waged on a computer network. Such an arrangement might be chosen, for example, in computer networks where frequent network maneuvering is desirable so as to increase the security thereof.

Alternatively, proactive/reactive trigger events based on the above described schemes can cause different types of network maneuvers. In such embodiments, a trigger event based on the results of an NBA analysis can have a different effect on the network maneuvering as compared to a trigger event based on the results of a packet inspection and/or a heuristic algorithm. For example, an NBA-based trigger event can cause strategic or defensive changes in the network maneuvering so as to more aggressively counter such NBAs. The precise nature of such measures can depend on the nature of the threat, but can include a variety of responses. For example, different pseudorandom algorithms can be selected, and/or the number of identity parameters selected for manipulation in each IDP set 120 can be increased. Also, the response can include increasing a frequency of network maneuvering. Thus, more frequent changes can be made with respect to (1) the false identity parameter values, (2) the selection of identity parameters to be changed in each IDP set, and/or (3) the position of the first and second locations where identity parameters are changed. Accordingly, the network maneuvering described herein provides a method for changing a mission plan or security model in a purely spontaneous manner based on a variety of factors, thereby increasing the security thereof.

Mission Plans

According to a preferred embodiment of the invention, the network maneuvering described herein is controlled in accordance with a mission plan. A mission plan is a schema that defines and controls maneuverability within the context of a network and at least one security model. As such, the mission plan can be represented as a data file that is communicated from the NAC 104 to each module 105-107, 113-114 of FIG. 1. The mission plan is thereafter used by each module to control the manipulation of identity parameters and coordinate its activities with the actions of the other modules in the network.

According to a preferred embodiment, the mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

The process of creating a mission plan can begin by modeling the computer network 100. The creation of the model is facilitated by an NCSA executing on a computer or server at the network command center. For example, in the embodiment shown in FIG. 1, the NCSA can execute on NAC 104. The network model preferably includes information which defines data connections and/or relationships between various computing devices included in the computer network 100. The NCSA will provide a suitable interface which facilitates entry of such relationship data. According to one embodiment, the NCSA can facilitate entry of data into tables which can be used to define the mission plan. However, in a preferred embodiment, a GUI is used to facilitate this process.

Figure 3:
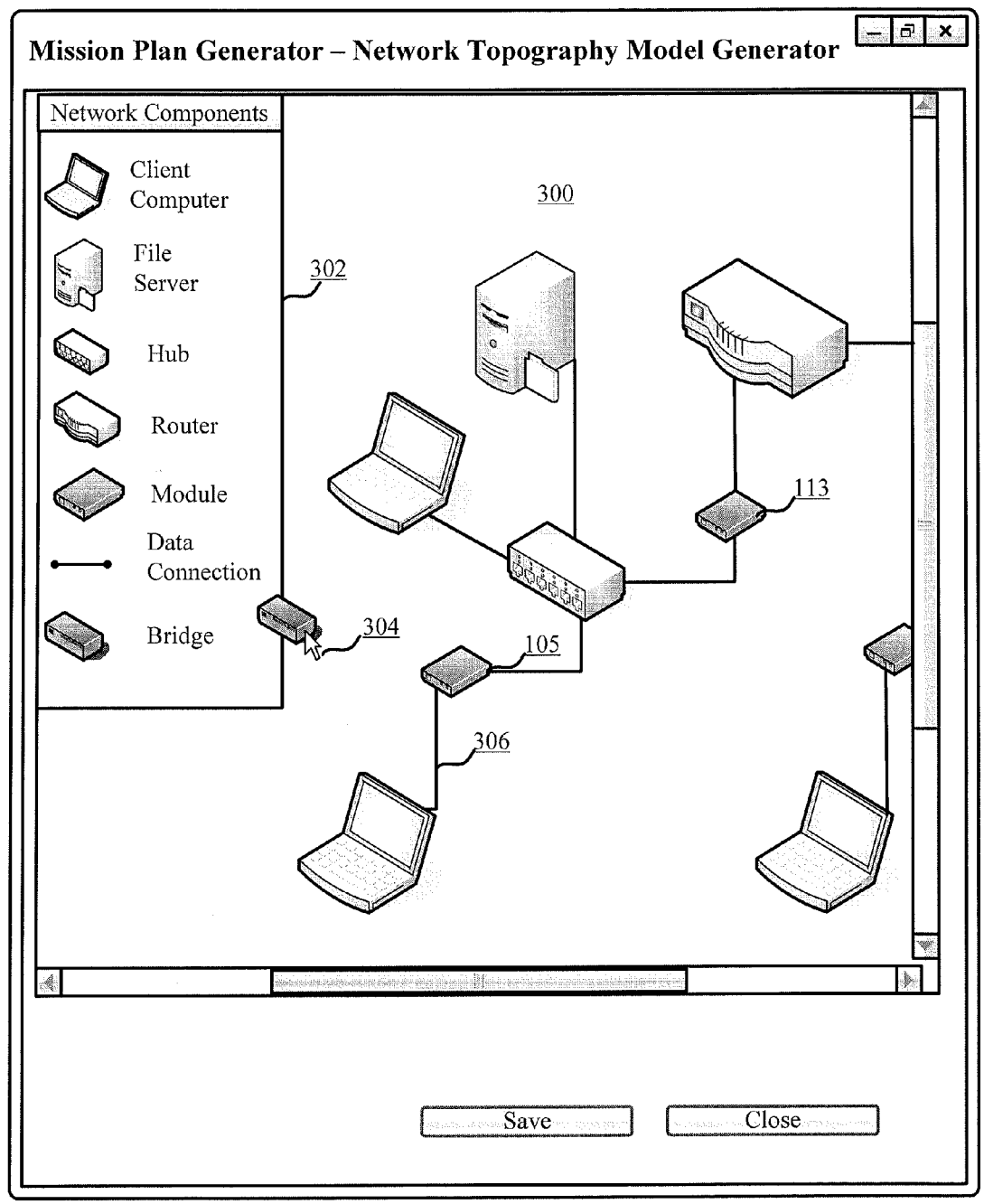
FIG. 3 is a drawing that is useful for understanding a tool that can be used to help characterize the network in FIG. 1.

Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302, by using a cursor 304. The network administrator can also create data connections 306 between various network components 302. As part of this modeling process, the network administrator can provide network address information for the various network components, including the modules 105-107, 113, 114 of FIG. 1.

Figure 4:
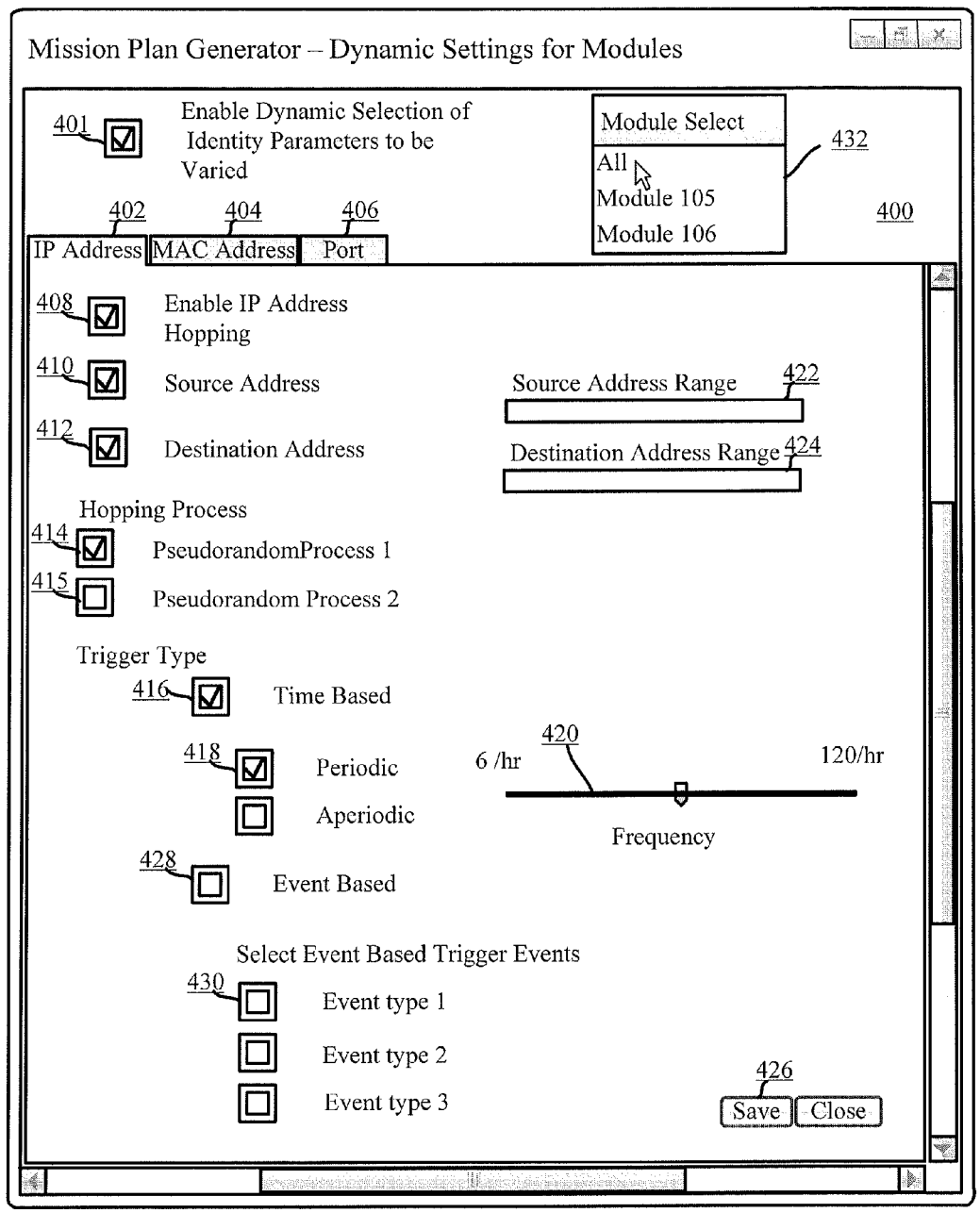
FIG. 4 is an example of a dialog box of a Graphical User Interface ("GUI") that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g., module 105 of FIG. 1) to which the settings in dialog box 400 are to be applied. Alternatively, the network administrator can use drop-down menu 432 to indicate that the settings in dialog box 400 are intended to be applied to all modules within the network (e.g., by selecting the command "All" in the drop-down menu 432). The process can continue by specifying whether a fixed set of identity parameters will always be modified in each of the modules, or whether the set of identity parameters that are manipulated shall be dynamically varied. If the selection or set of identity parameters that are to be manipulated in the modules is intended to be dynamically varied, the network administrator can mark check-box 401 to indicate that preference. If the check-box 401 is not marked, then the set of identity parameters to be varied is a fixed set that does not vary over time.

The dialog box 400 includes tabs 402, 404, 406 which allow a user to select the particular identity parameter that he/she wants to work with for purposes of creating a mission plan. For purposes of this disclosure, the dialog box 400 facilitates dynamic variation of only three identity parameters. Specifically, these include the IP address, MAC address and port address. More or fewer identity parameters can be dynamically varied by providing additional tabs, but the three identity parameters noted are sufficient to explain the inventive concepts. In FIG. 4, the user has selected the tab 402 to work with the IP address type of identity parameter. Within tab 402, a variety of user interface controls 408-420 are provided for specifying the details relating to the dynamic variation of IP addresses within the selected module. More or fewer controls can be provided to facilitate the dynamic manipulation of the IP address type, and the controls shown are merely provided to assist the reader in understanding the concept. In the example shown, the network administrator can enable dynamic variation of IP addresses by selecting (e.g., with a pointing device such as a mouse) the check-box 408 marked: "Enable IP Address Hopping". Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the computer network 100.

Dialog box 400 also allows a network administrator to set the trigger type to be used for the dynamic variation of the IP address identity parameter. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between six trigger occurrences per hour (trigger every ten minutes) and one hundred twenty trigger occurrences per hour (trigger every thirty seconds). In this example, selections are available for other types of triggers as well. For example, dialog box 402 includes check boxes 428, 430 by which the network administrator can select an event-based trigger. Several different specific event types can be selected to form the basis for such event-based triggers (e.g., Event type 1, Event type 2, etc.). These event types can include the detection of: a packet having a particular origin or destination; a code word contained in a packet; secret or confidential information contained in a packet; a particular level of congestion; a particular traffic pattern; a particular protocol pattern; a particular entropy pattern; a security threat; an NBA of a particular level and/or type; and a particular number of NBAs currently being waged on a computer network. In FIG. 4, tabs 404 and 406 are similar to tab 402, but the controls therein are tailored to the dynamic variation of the MAC address and port value rather than the IP address. Additional tabs could be provided for controlling the dynamic variation of other types of identity parameters.

The mission plan can also specify a plan for dynamically varying the location where identity parameters are modified. In some embodiments, this variable location feature is facilitated by controlling a sequence that defines when each module is in an active state or a bypass state. Accordingly, the mission plan advantageously includes some means of specifying this sequence. In some embodiments of the invention, this can involve the use of defined time intervals or time slots, which are separated by the occurrence of a trigger event.

Figure 5:
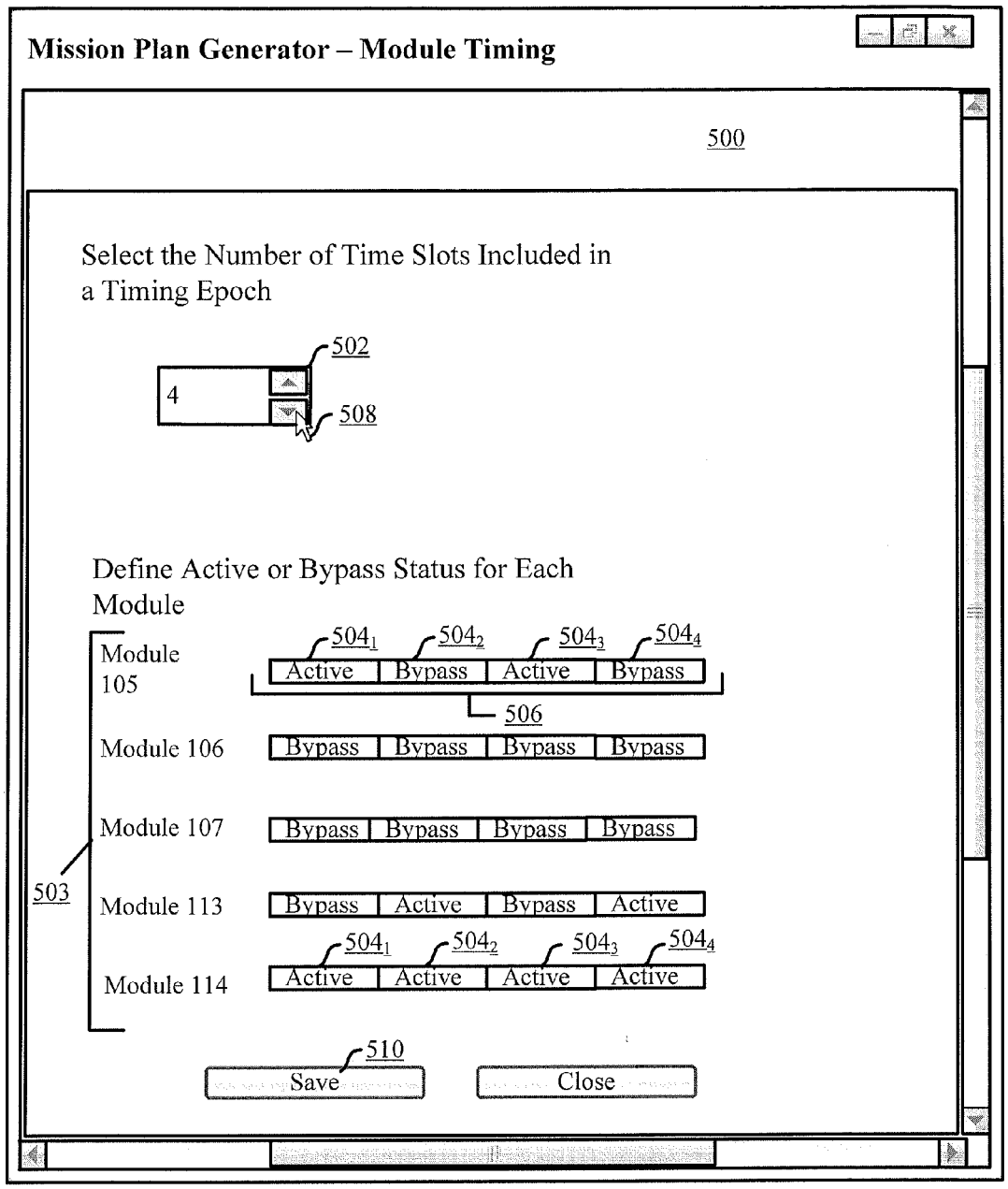
FIG. 5 is an example of a dialog box of a GUI that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$ which are to be included within a time epoch 506. In the example illustrated, the network administrator has defined four time slots per timing epoch. The dialog box 500 can also include a table 503 which includes all modules in the computer network 100. For each module listed, the table includes a graphical representation of available time slots $504_1$-$504_4$ for one timing epoch 506. Recall that dynamic control over the location where identity parameters are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of identity parameters occurs at a location associated with module 105 during time slots $504_1$ and $504_3$, but occurs instead at module 113 during time slots $504_2$, $504_4$.

In the example shown in FIG. 5, the network administrator has elected to have module 114 always operate in an active mode (i.e., module 114 is active during all time slots). Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of identity parameters will be performed at these modules during any of the defined time slots. Once the module timing has been defined in dialog box 500, the network administrator can select the button 510 to store the changes as part of an updated mission plan. The mission plan can be saved in various formats. In some embodiments, the mission plan can be saved as a simple table or other type of defined data structure that can be used by each module for controlling the behavior of the module.

Distribution and Loading of Mission Plans

The distribution and loading of mission plans as disclosed herein will now be described in further detail. Referring once again to FIG. 1, it can be observed that the modules 105-107, 113, 114 are distributed throughout the computer network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g., maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a GUI control panel. Commands for controlling the operating states of the network are communicated over the computer network 100, or can be communicated by any other suitable means. For example, a separate wired or wireless network (not shown) can be used for that purpose.

Figure 6:
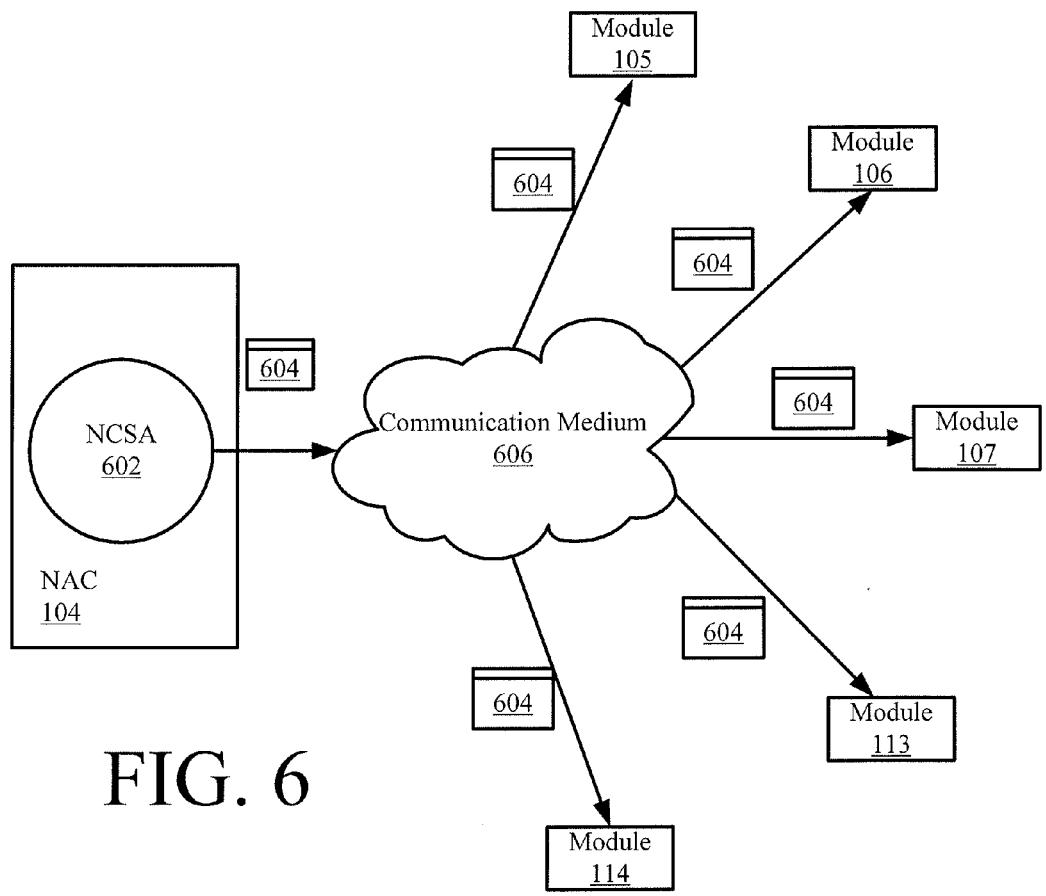
FIG. 6 is a diagram that is useful for understanding the way in which a mission plan can be communicated to a plurality of modules in the network in FIG. 1.
Figure 7:
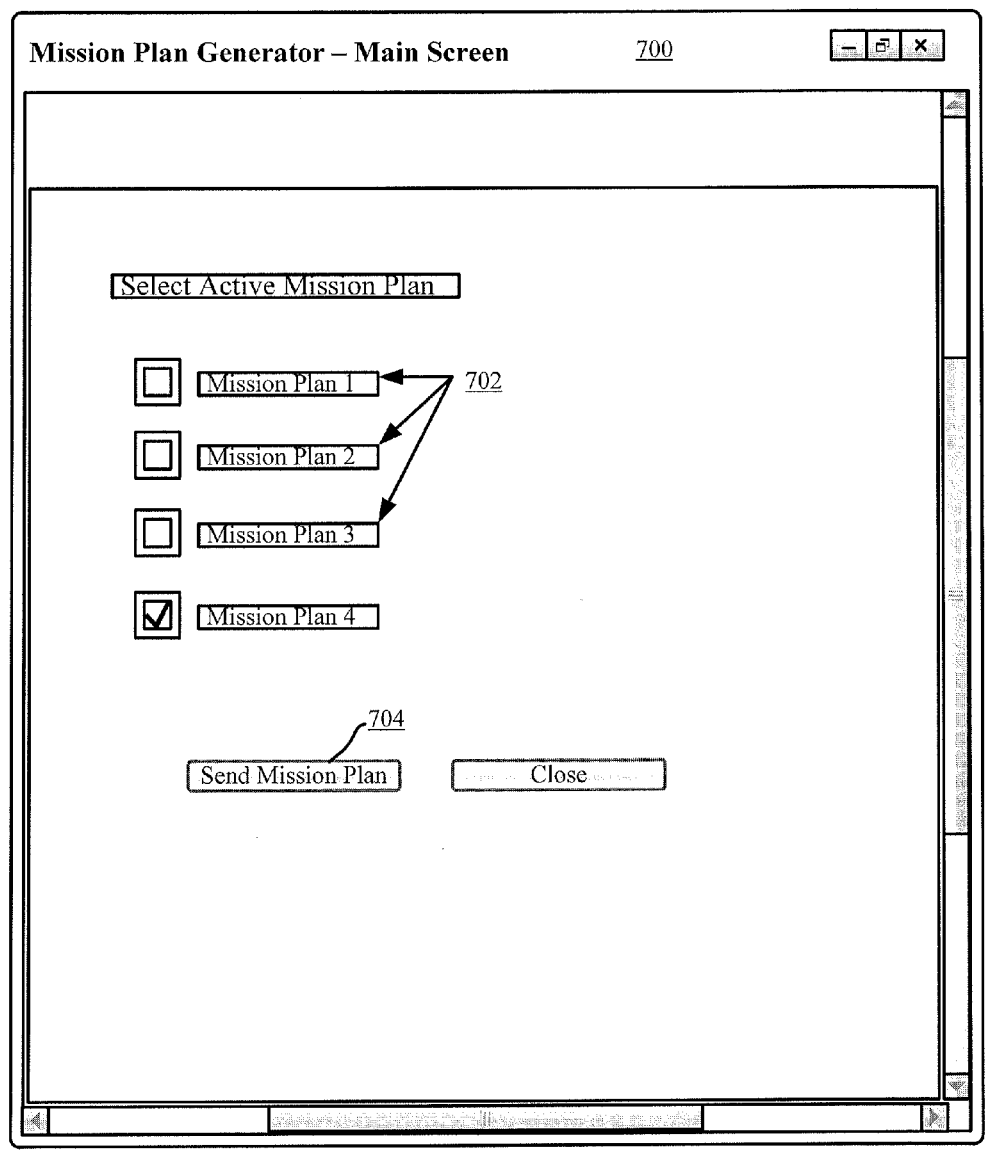
FIG. 7 is an example of a dialog box of a GUI that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some embodiments include in-band signaling using computer network 100. Alternatively, an out-of-band network (e.g., a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a "Send Mission Plan" button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of identity parameters as described herein. Such an arrangement minimizes the time during which the network operates in the clear and without manipulating identity parameters. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that identity parameter values are varied. Once the new mission plan has been loaded, the modules 105-107, 113, and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various identity parameters at each module 105, 106, 107, 113, and 114 is preferably controlled by the application software executing on each module 105-107, 113, 114. However, the behavior of the application software is advantageously controlled by the mission plan.

Figure 8:
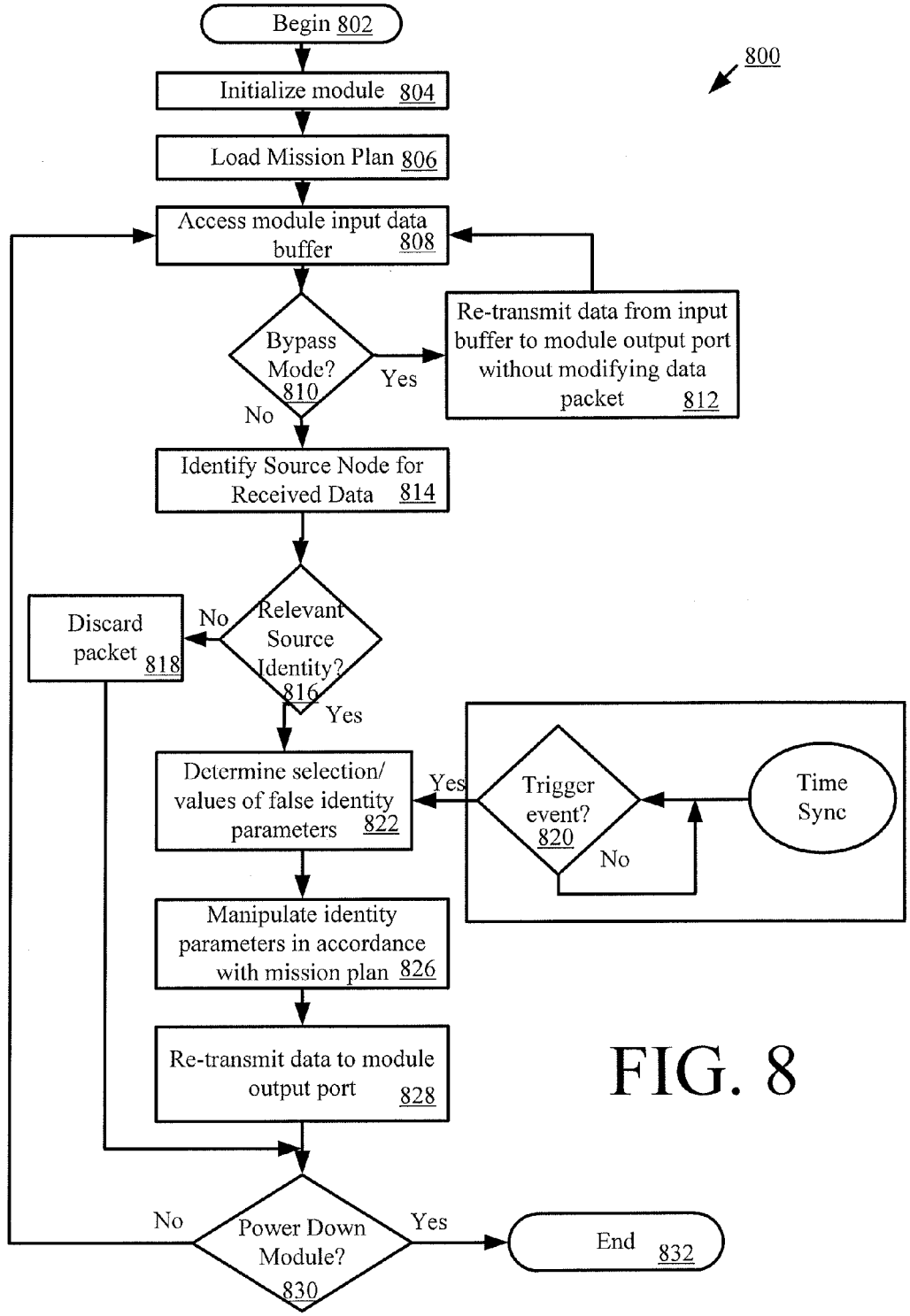
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process 800 is described with respect to communications in a single direction. For example, in the case of module 105, the single direction could involve data transmitted from client computer 101 to hub 108. In practice however, it is preferred that modules 105-107, 113, 114 operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node then the packet is discarded in step 818. In step 820, the process checks to determine if a trigger event occurred. The occurrence of a trigger event will influence the selection of false identify values to use. Accordingly, in step 822, the module determines the false identify values to use based on one or more of the trigger information, clock time and mission plan. The module then continues to step 826 where it manipulates identity parameters of the data packet. Once manipulations are complete, the data packet is re-transmitted to an adjacent node from the output port of the module. In step 830, a determination is made as to whether the module has been commanded to power down. If so, the process ends at step 832. In step 808, the process continues and the next data packet is accessed from the module's input data buffer.

Figure 9:
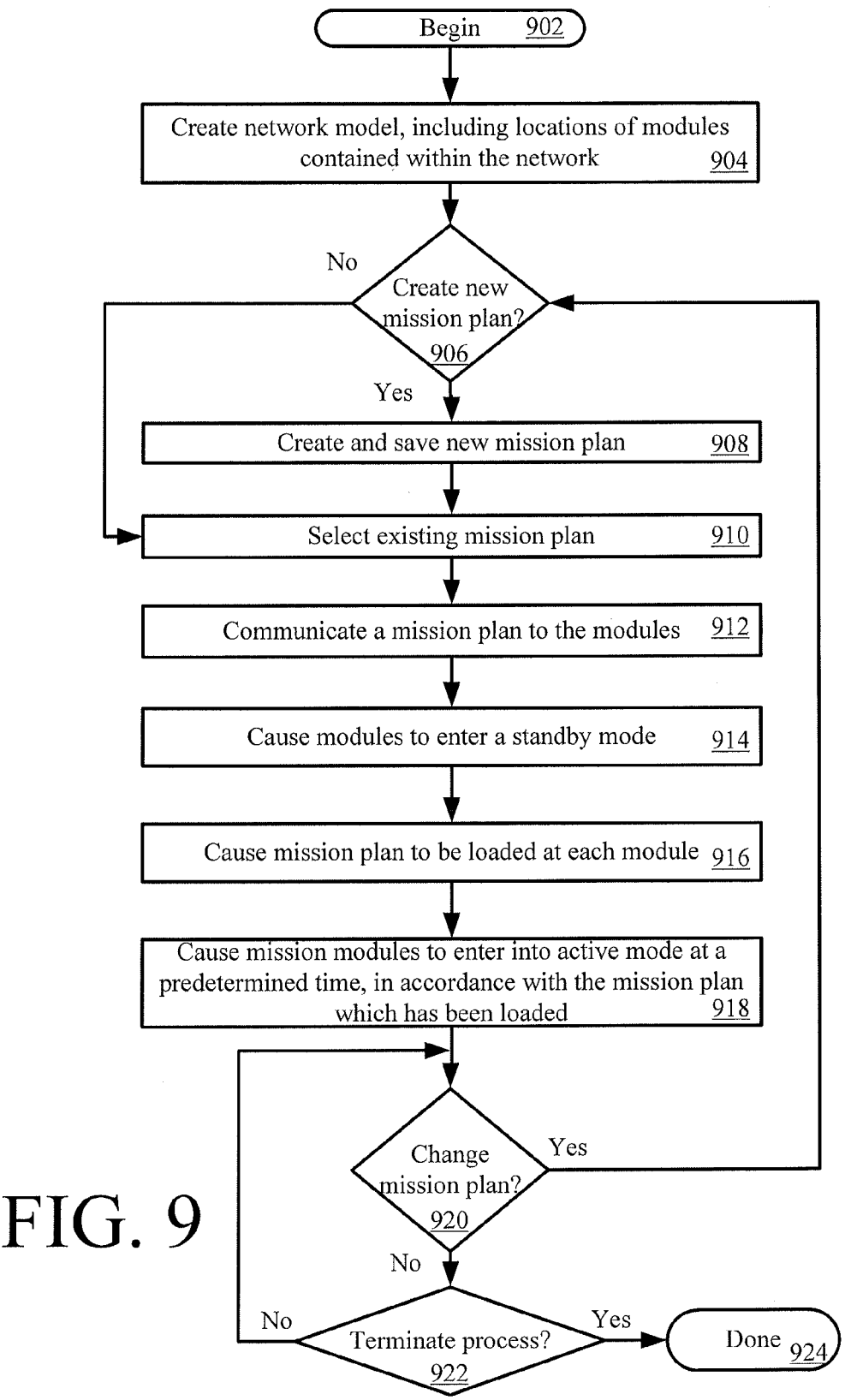
FIG. 9 is a flowchart that is useful for understanding the operation of a Network Control Software Application ("NCSA") in relation to creating and loading mission plans.

Referring now to FIG. 9, there is provided a flowchart which summarizes the methods described herein for managing a dynamic computer network. The process begins in step 902 and continues to step 904, where a network model is created (e.g., as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g., modules 105-107, 113, 114 of FIG. 1), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of identity parameters. In step 918, the mission modules are again caused to enter into an active operational mode in which each mission module performs manipulations of identity parameters in accordance with the mission plan. Steps 914, 916 and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desire to change the mission plan; if so, the process returns to step 906, where it continues as described above. If there is no indication that the user or network administrator wishes to change an existing mission plan, then the process determines in step 922 whether it has been instructed to terminate. If so, the process terminates in step 924. If no termination instruction is received, the process returns to step 920 and continues.

Figure 10:
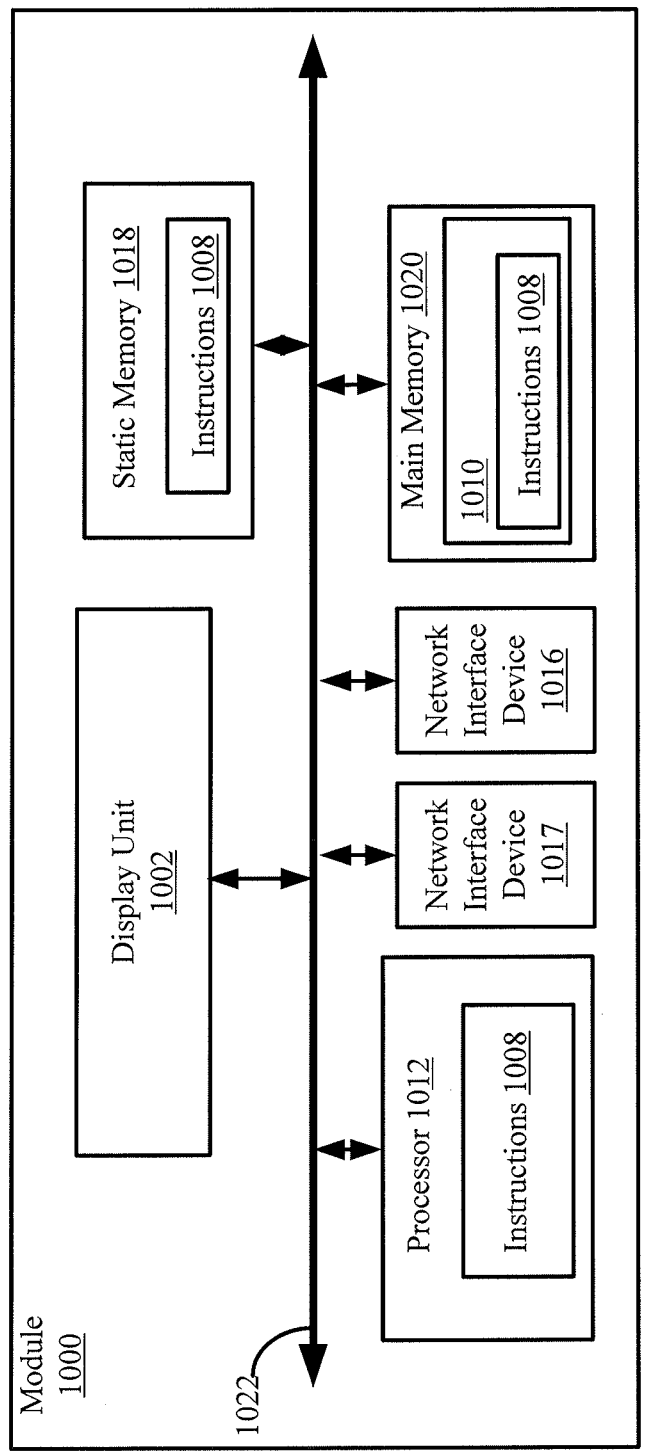
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of identity parameters described herein. The module 1000 includes a processor 1012 (such as a Central Processing Unit ("CPU")), a main memory 1020 and a static memory 1018, which communicate with each other via a bus 1022. The module 1000 can further include a display unit 1002, such as a Liquid Crystal Display ("LCD") to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various embodiments of the present invention a network interface device 1016 connected to a network environment communicates over the network using the instructions 1008.

The instructions 1008 cause the module 1000 to act as a translator of identity parameters between those of a packet-based static network and those of a packet-based MTT enabled network. A conventional protocol stack for the packet-based static network is provided in FIG. 11. According to the embodiment shown in FIG. 11, the protocol stack 1100 includes five layers 1102, 1104, 1106, 1108, 1110 specifying particular functions of nodes within the packet-based static network. Still, the invention is not limited in this regard. The protocol stack 1100 can include any number of layers in accordance with a particular packet-based static network application. For example, if an Open System Interconnection ("OSI") protocol stack is employed by the static network then the protocol stack 1100 can further include a session layer and a presentation layer.

Referring again to FIG. 11, the protocol stack 1100 provides a framework illustrating how information is passed from a software application installed in a first node of the static network (e.g., a client computer) to a software application installed in a second node of the static network (e.g., a client computer). The protocol stack 1100 is well known to persons skilled in the art. Thus, the protocol stack 1100 will not be described in detail herein. However, a brief discussion is provided below to assist a reader in understanding the identity parameter translation which is performed at least by the modules 105-108, 114 of FIG. 1.

Figure 11:
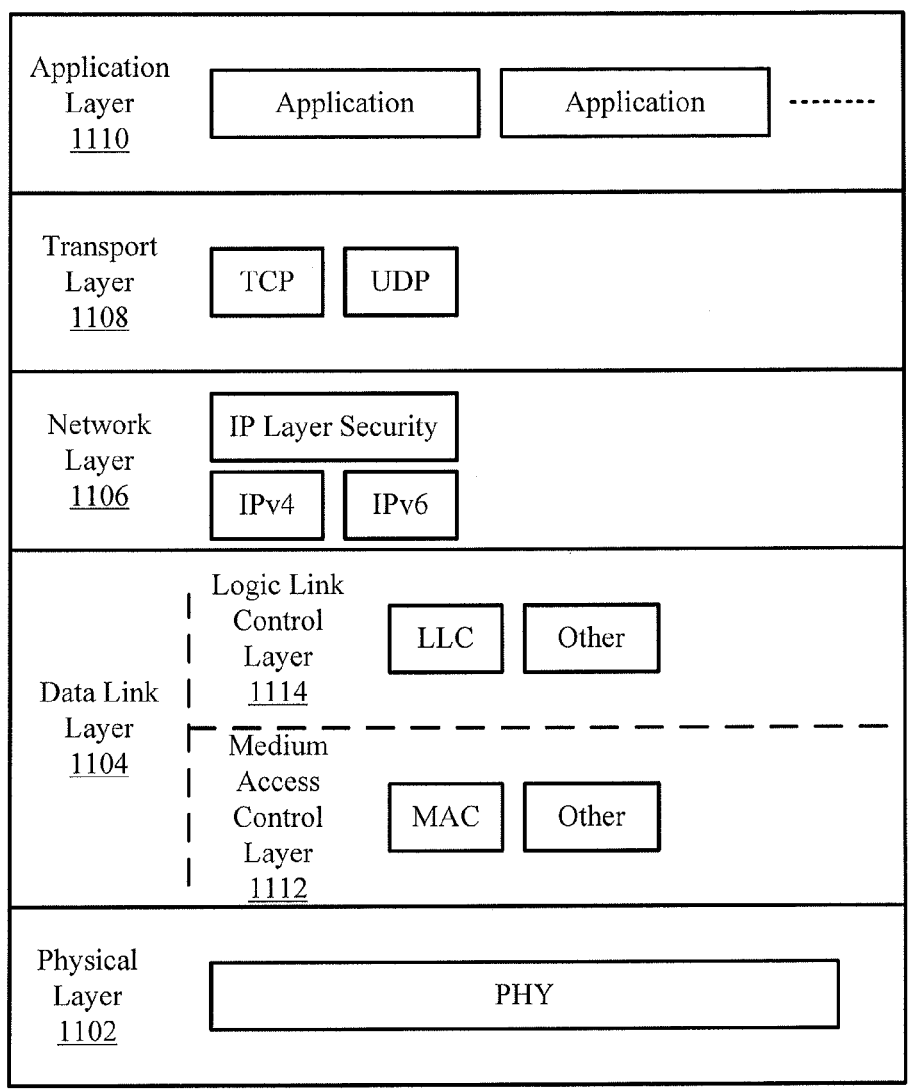
FIG. 11 is a schematic illustration of a conventional protocol stack.

As shown in FIG. 11, the protocol stack 1100 is comprised of a physical layer 1102, a data link layer 1104, a network layer 1106, a transport layer 1108, and an application layer 1110. The physical layer 1102 is comprised of firmware and/or hardware configured to send and receive data through a network. The data link layer 1104 provides transmission protocols for transferring data between network nodes. Such transmission protocols can include an Ethernet protocol (or an IEEE 802.3 protocol), a point-to-point protocol, an IEEE 802.11 protocol, an IEEE 802.15 protocol, an IEEE 802.16 protocol, and other such protocols.

The data link layer 1104 can be comprised of two (2) sub-layers, namely a Logic Link Control ("LLC") layer 1114 and a Media Access Control ("MAC") layer 1112. The LLC layer 1114 is comprised of firmware and/or hardware configured to multiplex protocols prior to being transmitted over the MAC layer 1112 and to de-multiplex protocols subsequent to being transmitted and upon receipt. The LLC layer 1114 is also comprised of firmware and/or hardware configured to provide flow control of packets, detection of packets, and retransmission of dropped packets.

The MAC layer 1112 is comprised of firmware and/or hardware configured to determine when to transmit communications and when to receive communications. In this regard, the MAC layer 1112 performs actions involving coordinating access to a shared radio channel and utilizing protocols that enhance communications over a wireless link. The term "protocol" as used herein refers to a set of rules defining how information is exchanged between network nodes. Such network nodes include, but are not limited to, the client computers, servers, routers, switches and bridges. The MAC layer 1112 provides transmission protocols for transferring data between network nodes. Such transmission protocols include MAC protocols. MAC protocols ensure that signals sent from different nodes across the same channel do not collide.

The network layer 1106 is comprised of firmware configured to transfer data from one node to another node. In this regard, the network layer 1106 provides protocols for transferring data from one node to another node. The transmission protocols include routing protocols and forwarding protocols. Such transmission protocols include internet protocols, such as a version four of the internet protocol ("IPv4"), a version six of the internet protocol ("IPv6"), and internet security protocols ("IP Layer Security").

The transport layer 1108 is comprised of firmware configured to communicate data between end systems. In this regard, the transport layer 1108 provides transport protocols for transmission of data between end systems. Such transport protocols include a Transmission Control Protocol ("TCP") and a User Datagram Protocol ("UDP"). The application layer 1110 is generally implemented only in firmware. The application layer 1110 provides signaling protocols for end-user applications, such as authentication applications, data syntax applications, quality of service applications, and end-user applications.

Figure 12:
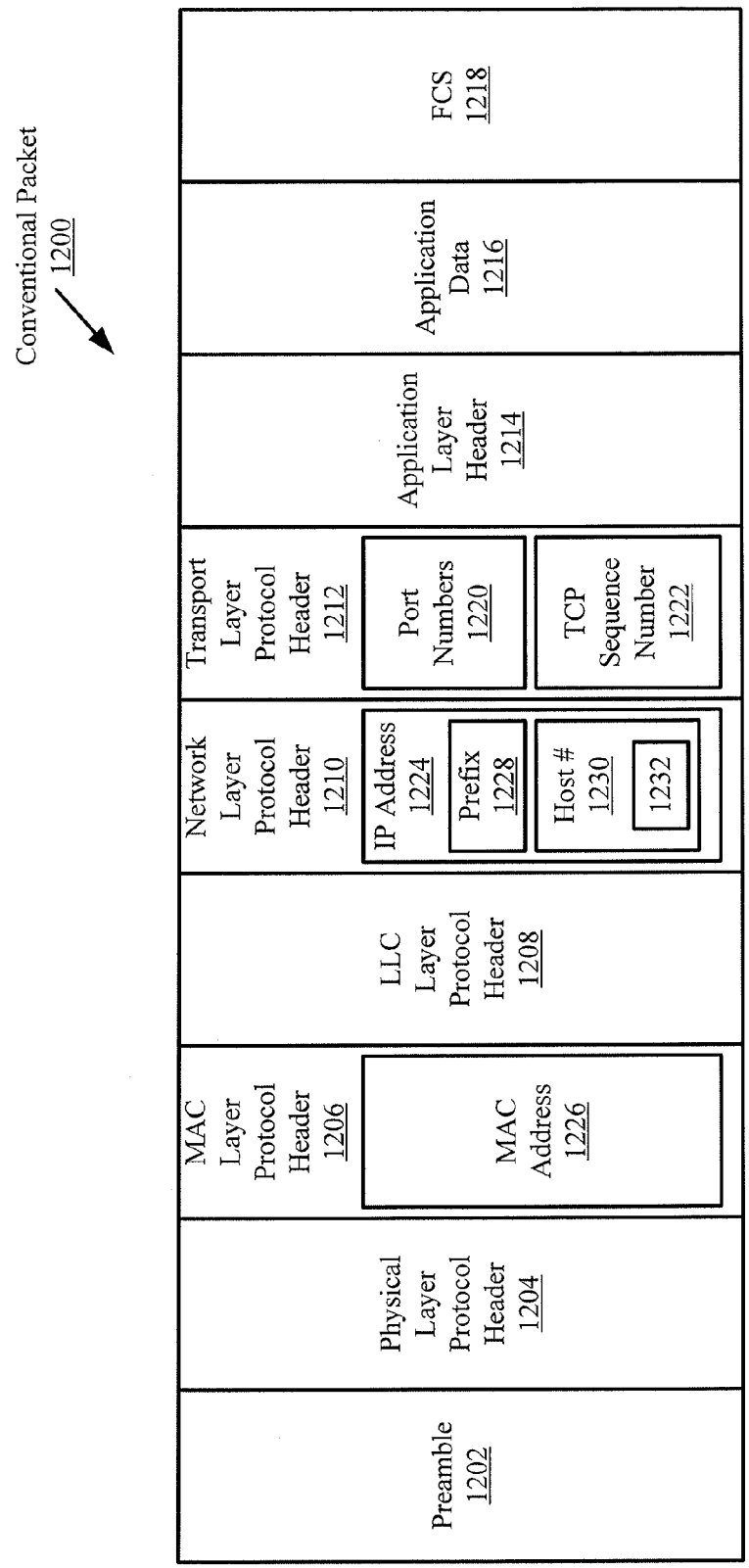
FIG. 12 is a schematic illustration of a conventional packet.

Referring now to FIG. 12, there is provided a block diagram of a conventional packet 1200 of a static network. The packet 1200 is comprised of a preamble 1202, a physical layer protocol header 1204, a MAC layer protocol header 1206, an LLC layer protocol header 1208, a network layer protocol header 1210, and a transport layer protocol header 1212. The packet 1200 is also comprised of an application layer header 1214, an application data 1216, and a Frame Check Sequence ("FCS") 1218. The phrase "frame check sequence", as used herein, refers to extra checksum characters added to a packet or a frame in a communication protocol for error detection and correction. Each of the listed components of the packet 1200 are well known to persons skilled in the art and are well defined in open industry standards of the Institute of Electrical and Electronics Engineers ("IEEE") standard for local and metropolitan area networks and Internet Engineering Task Force ("IEFT"). Thus, such components will not be described in detail herein.

However, it should be appreciated that the application data 1216 can be signaling protocol data, user data, or management data. The user data can include voice data, video data, or the like. It should also be appreciated that the application data 1216 is encapsulated between the application layer header 1214 and the FCS 1218. The application layer header 1214 is encapsulated between the transport layer protocol header 1212 and the application data 1216. Similarly, the transport layer protocol header 1212 is encapsulated between the network layer protocol header 1210 and the application layer header 1214. Likewise, the network layer protocol header 1210 is encapsulated between the LLC layer protocol header 1208 and transport layer protocol header 1212. The LLC layer protocol header 1208 is encapsulated between the MAC layer protocol header 1206 and the network layer protocol header 1210. The MAC layer protocol header 1206 is encapsulated between the physical layer protocol header 1204 and the LLC layer protocol header 1208. The physical layer protocol header 1204 is encapsulated between the preamble 1202 and the MAC layer protocol header 1206.

The transport layer protocol header 1212 comprises source and destination port numbers 1220. A port is an application-specific software construct serving as a communications endpoint in a computer's operating system. A port is identified for each IP address and protocol by a sixteen bit number (i.e., a port number 1220).

The transport layer protocol header 1212 also comprises a TCP sequence number 1222. Two client computers communicating with each other on opposite sides of a TCP session will each maintain a TCP sequence number 1222. The TCP sequence number 1222 allows each computer to track how much data it has communicated. The TCP sequence number is included in the TCP header portion of each packet which is communicated during the session. At the initiation of a TCP session, the initial sequence number value is randomly selected.

The network layer protocol header 1210 comprises source and destination IP addresses 1224. An IP address 1224 is a numerical identifier assigned to a computing device participating in a computer network where the network uses the well known internet protocol for communication. The IP address 1224 can be a thirty two bit number in an IPv4 system or one hundred twenty eight bit number in an IPv6 system. The IP address 1224 is a binary number, but is usually stored in a text file and displayed in a human-readable notation (e.g., 175.18.252.1. for IPv4 systems and 2003:db6:0:1234:0:469: 6:1 for IPv6).

In some embodiments, each IP address 1224 can be thought of as a single identity parameter. However, an IP address 1224 is generally defined as including at least two parts which include a network prefix 1228 and a host number 1230. The network prefix 1228 identifies a network to which a data packet 1200 is to be communicated. The host number 1230 identifies the particular node within a Local Area Network ("LAN"). A sub-network (sometimes referred to as a subnet) is a logical portion of an IP network. Where a network is divided into two or more sub-networks, a portion of the host number 1230 of the IP address 1224 is used to specify a subnet number 1232. For purposes of the present invention, the network prefix 1228, the subnet number 1232 and the host number 1230 can each be considered to be a separate identity parameter. Since a source IP address and a destination IP address is contained in the network layer protocol header 1210, there are a total of six different identity parameters in the header 1210.

The MAC layer protocol header 1206 comprises a MAC Address 1226. A MAC address 1226 is a unique value assigned to a network interface device by a manufacturer and stored in an onboard ROM. The MAC address 1226 can include a forty-eight bit number or a sixty-four bit number depending on the protocol employed by the MAC layer 1112 of the protocol stack 1100.

Figure 13:
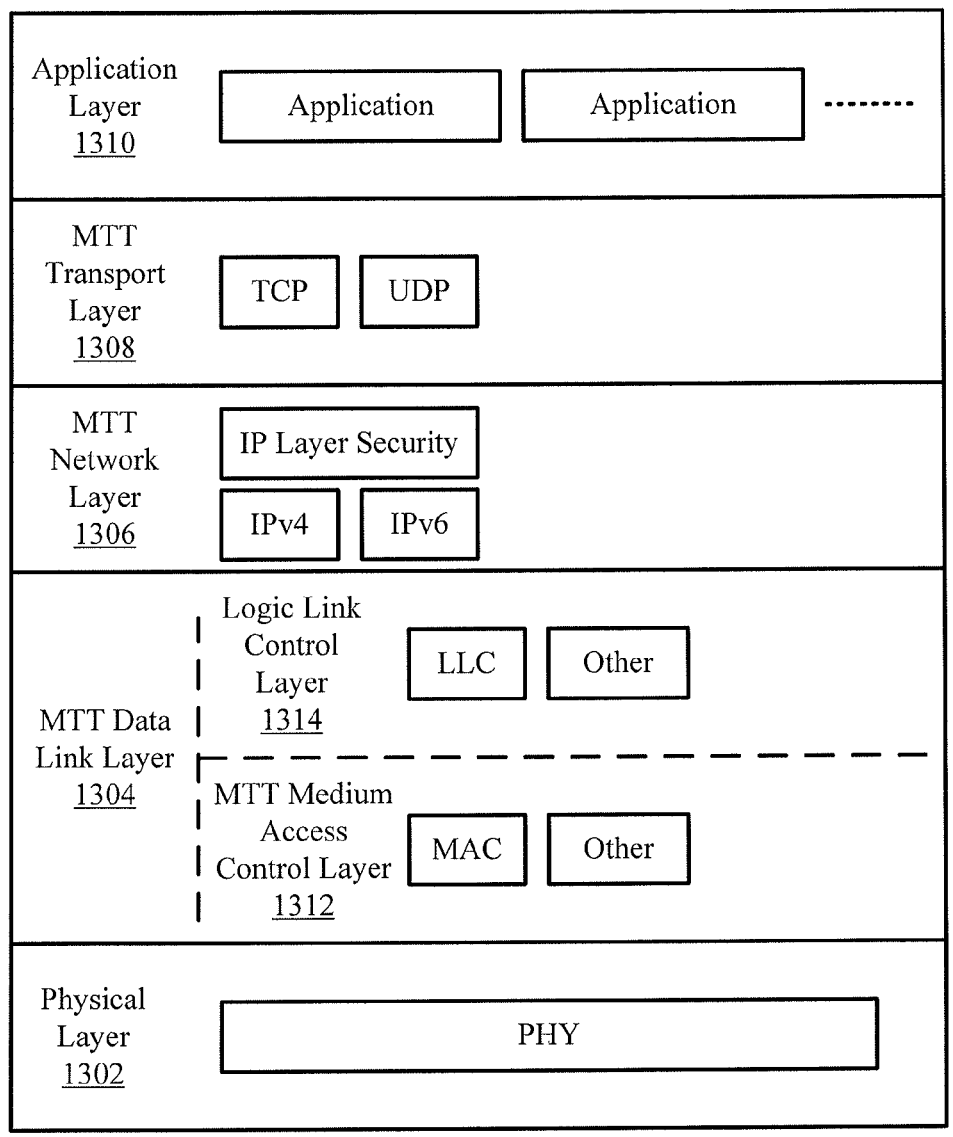
FIG. 13 is a schematic illustration of a Moving Target Technology ("MTT") protocol stack.

The MTT enabled network employs protocols of an MTT protocol stack. A schematic illustration of an exemplary MTT protocol stack 1300 is provided in FIG. 13. As shown in FIG. 13, the MTT protocol stack 1300 comprises five layers 1302-1314 specifying particular functions of nodes within the MTT enable network. Notably, some of the layers 1302, 1310, 1314 are the same as those 1102, 1110, 1114 of the protocol stack 1100. As such, the description provided above in relation to these layers 1102, 1110, 1114 is sufficient for understanding layers 1302, 1310, 1314 of FIG. 13. However, the MTT protocol stack 1300 comprises layers 1304-1308 which are different than those 1104-1108 of protocol stack 1100. As such, a brief discussion of these layers will be provided below.

The MTT data link layer 1304 can be comprised of two (2) sub-layers, namely an LLC layer 1314 and an MTT MAC layer 1312. The LLC layer 1314 is the same as or substantially similar to the LLC layer 1114 of FIG. 11. As such, the description provided above in relation to layer 1114 is sufficient for understanding layer 1314. The MTT MAC layer 1312 is different than the MAC layer 1112 of FIG. 11. In this regard, it should be understood that the MAC layer 1112 employs a static MAC address 1226 for each network interface device. In contrast, the MTT MAC layer 1312 employs a non-static MAC address (e.g., MTT MAC address 1426 of FIG. 14) for each network interface device. The non-static MAC address is dynamically variable. For example, the non-static MAC address can be randomly or pseudo-randomly changed during operation of the MTT enabled network.

The MTT network layer 1306 is different than the network layer 1106 of FIG. 11. In this regard, it should be understood that the network layer 1106 employs static IP addresses 1224. In contrast, the IP addresses (e.g., MTT IP addresses 1424 of FIG. 14) of the MTT network layer 1306 are non-static (i.e., they can be dynamically varied during operations of the MTT enabled network). For example, an IP address number can be changed in accordance with a pseudo-random process.

The MTT transport layer 1308 is different than the transport layer 1108 of FIG. 11. The transport layer 1108 employs static port numbers 1220 and static TCP sequence numbers 1222. In contrast, the port numbers (e.g., numbers 1420 of FIG. 14) and TCP sequence numbers (e.g., numbers 1422 of FIG. 14) employed by the MTT transport layer 1308 are non-static. In this regard, it should be understood that each of the non-static port numbers and sequence numbers can be changed in accordance with a random or pseudo-random process.

Figure 14:
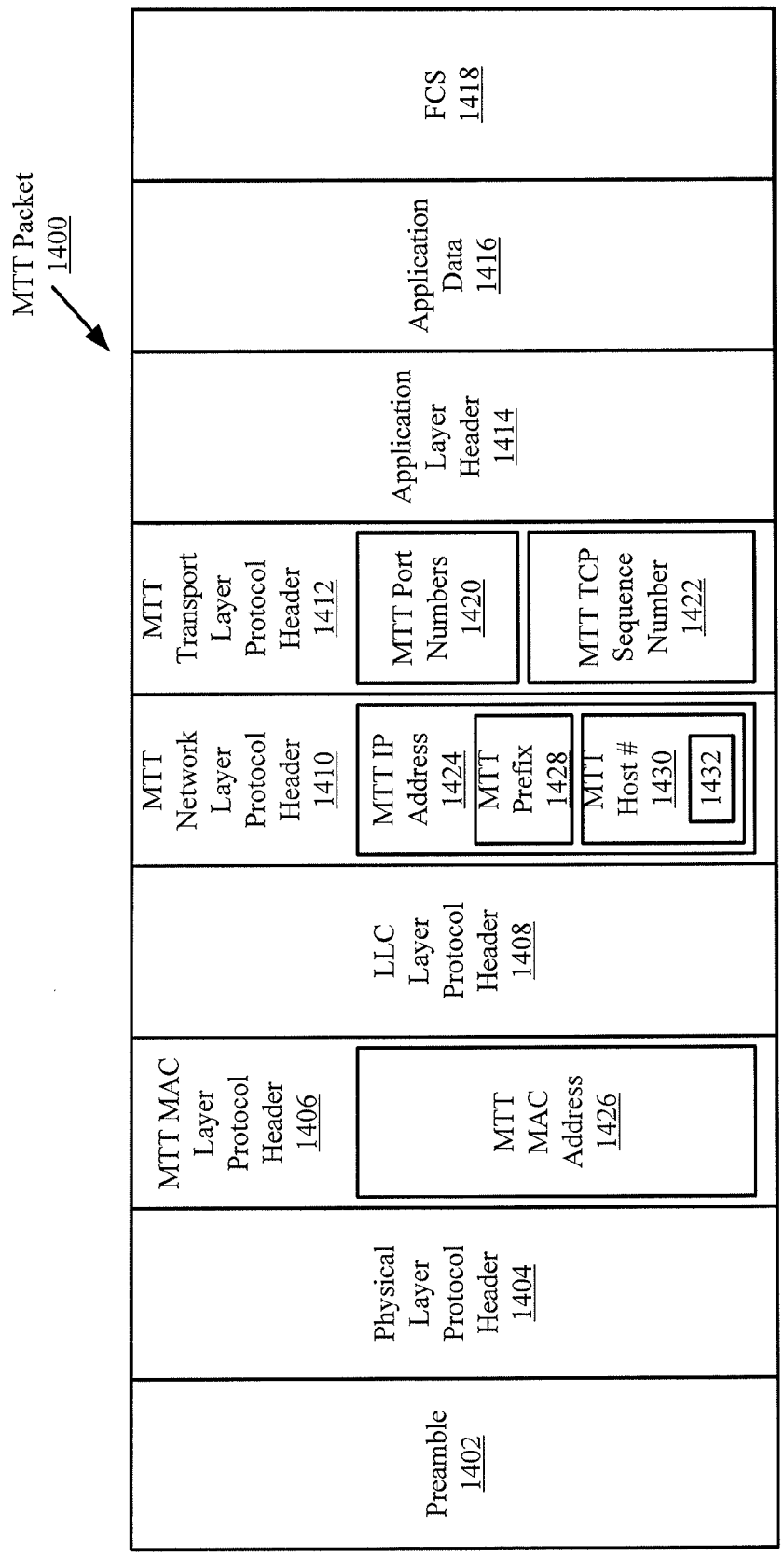
FIG. 14 is a schematic illustration of an MTT packet.

Referring now to FIG. 14, there is provided a schematic illustration of an exemplary MTT packet 1400 of the MTT enabled network. The MTT packet 1400 is comprised of a preamble 1402, a physical layer protocol header 1404, an MTT MAC layer protocol header 1406, an LLC layer protocol header 1408, an MTT network layer protocol header 1410, an MTT transport layer protocol header 1412, an application layer header 1414, application data 1416 and an FCS 1418. Portions 1402, 1404, 1408, 1414, 1416, 1418 of the MTT packet 1400 are the same as or substantially similar to portions 1202, 1204, 1208, 1214, 1216, 1218 of FIG. 12. As such, the description provided above in relation to portions 1202, 1204, 1208, 1214, 1216, 1218 is sufficient for understanding portions 1402, 1404, 1408, 1414, 1416, 1418 of the MTT packet 1400. However, portions 1406, 1410, 1412 are different than portions 1206, 1210, 1212 of FIG. 12. As such, each of the portions 1406, 1410, 1412 will be described herein.

The MTT transport layer protocol header 1412 comprises MTT source and destination port numbers 1420. A port is an application-specific software construct serving as a communications endpoint in a computer's operating system. A port is identified for each IP address and protocol by a sixteen bit number. The sixteen bit number is referred to in relation to an MTT enabled network as an MTT port number 1420. Notably, each MTT port number 1420 is a non-static number (i.e., it can be changed by a module in accordance with a random or pseudo-random process). The MTT transport layer protocol header 1412 also comprises an MTT TCP sequence number 1422. The MTT TCP sequence number 1422 is a non-static number. Manipulation of the MTT port number 1420 and the MTT TCP sequence number 1422 can be accomplished by simply modifying the TCP header information to change values thereof.

The MTT network layer protocol header 1410 comprises source and destination MTT IP addresses 1424. A value of each MTT IP address 1424 can be dynamically varied in accordance with a random or pseudo-random process. Each MTT IP address 1424 comprises an MTT prefix 1428 and an MTT host number 1430. Each of these components 1428, 1430 can also be dynamically varied during operation of an MTT enabled network. Manipulation of the MTT IP addresses 1424, the MTT prefix 1428 and the MTT host number 1430 can be achieved by simply modifying the IP header information of the MTT network layer protocol header 1410.

The MTT MAC layer protocol header 1406 comprises an MTT MAC Address 1426. The MTT MAC address 1426 can be dynamically varied during operation of the MTT enabled network. Manipulation of the MTT MAC address 1426 can be achieved by simply modifying an Ethernet header information of the MTT MAC layer protocol header 1406.

Figure 15:
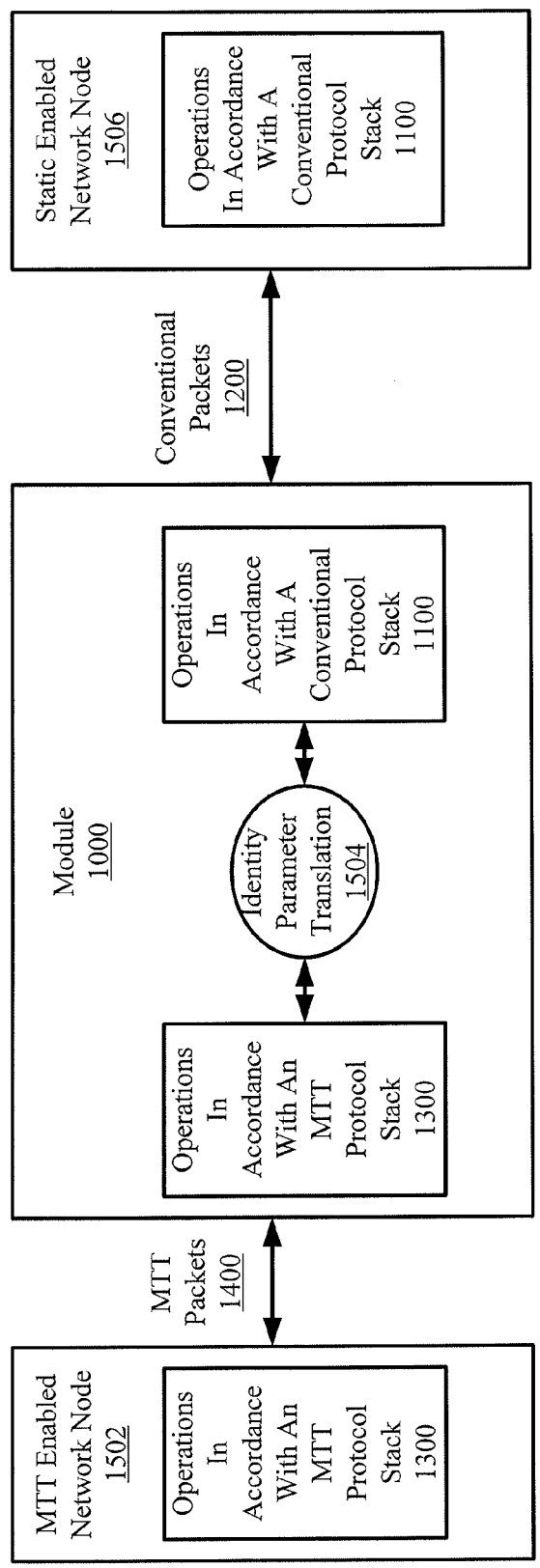
FIG. 15 is a schematic illustration that is useful for understanding the operations of a module configured to translate identity parameters.

Referring now to FIG. 15, there is provided a schematic illustration that is useful for understanding operations of the module 1000 when it is implemented as hardware. As shown in FIG. 15, the module 1000 performs operations in accordance with both protocol stacks 1200, 1400. In this regard, the module 1000 is configured to communicate MTT packets 1400 to and from an MTT enabled network node 1502 (e.g., a node 104-109, 111 or 112 of FIG. 1). The module 1000 is also configured to communicate conventional packets 1200 to and from a static enabled network node 1506 (e.g., a node 101-103, 110 or 115 of FIG. 1). The module 1000 is further configured to convert conventional packets 1200 into MTT enabled packets 1400, and vice versa. This packet conversion is achieved via an Identity Parameter Translation ("IPT") 1504. A process for achieving an IPT generally involves: de-encapsulating and re-encapsulating application layer portions 1214, 1216, 1414, 1416 of the packets 1200, 1400. Methods for encapsulating and de-encapsulating packets are well known in the art, and therefore are not be described herein. Any known method or to be known method for encapsulating and de-encapsulating packets can be used with the present invention without limitation. Examples of such processes for achieving an IPT are illustrated in FIGS. 16 and 17.

Figure 16:
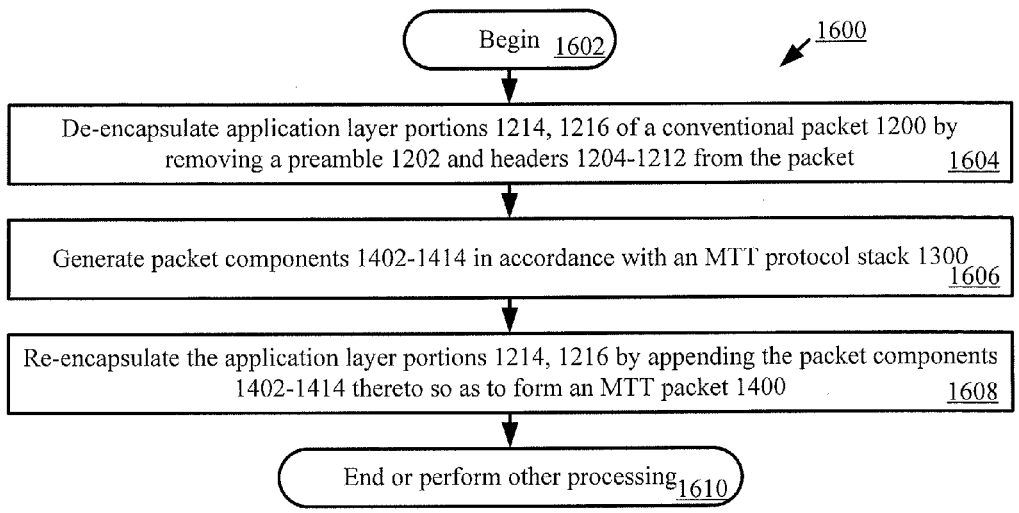
FIGS. 16-17 each provide a flow diagram of an exemplary process for changing at least one identity parameter of a packet.

As shown in FIG. 16, an exemplary process 1600 begins at step 1602 and continues with step 1604. In step 1604, the application layer portions 1214, 1216 of the conventional packet 1200 are de-encapsulated by removing the preamble 1202 and headers 1204-1212 from the packet. In a next step 1606, the packet components 1402-1414 are generated in accordance with the protocols of the MTT protocol stack

1300. Thereafter, step 1608 is performed where the application layer portions 1214, 1216 are re-encapsulated so as to form an MTT packet 1400. The re-encapsulation is achieved by appending the packet components 1402-1414 thereto. Upon completing step 1608, the process 1600 ends or other processing is performed.

Figure 17:
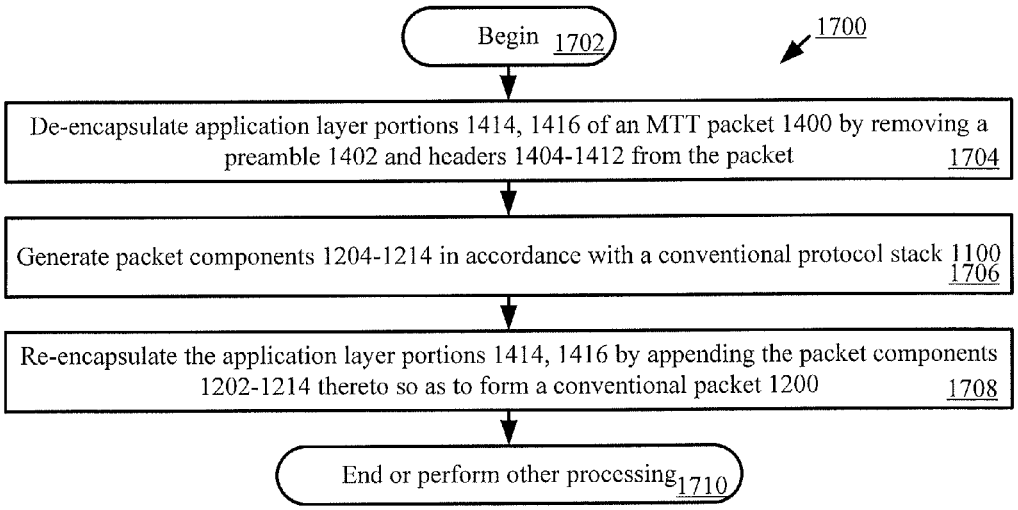

As shown in FIG. 17, an exemplary process 1700 begins at step 1702 and continues with step 1704. In step 1704, the application layer portions 1414, 1416 of an MTT packet 1400 are de-encapsulated by removing the preamble 1402 and headers 1404-1412 from the packet 1400. Next in step 1706, the packet components 1204-1214 are generated in accordance with the protocols of the conventional protocol stack 1200. In a next step 1708, the application layer portions 1414, 1416 are re-encapsulated by appending the preamble 1202 and headers 1204-1214 thereto so as to form a conventional packet 1200.

Figure 18:
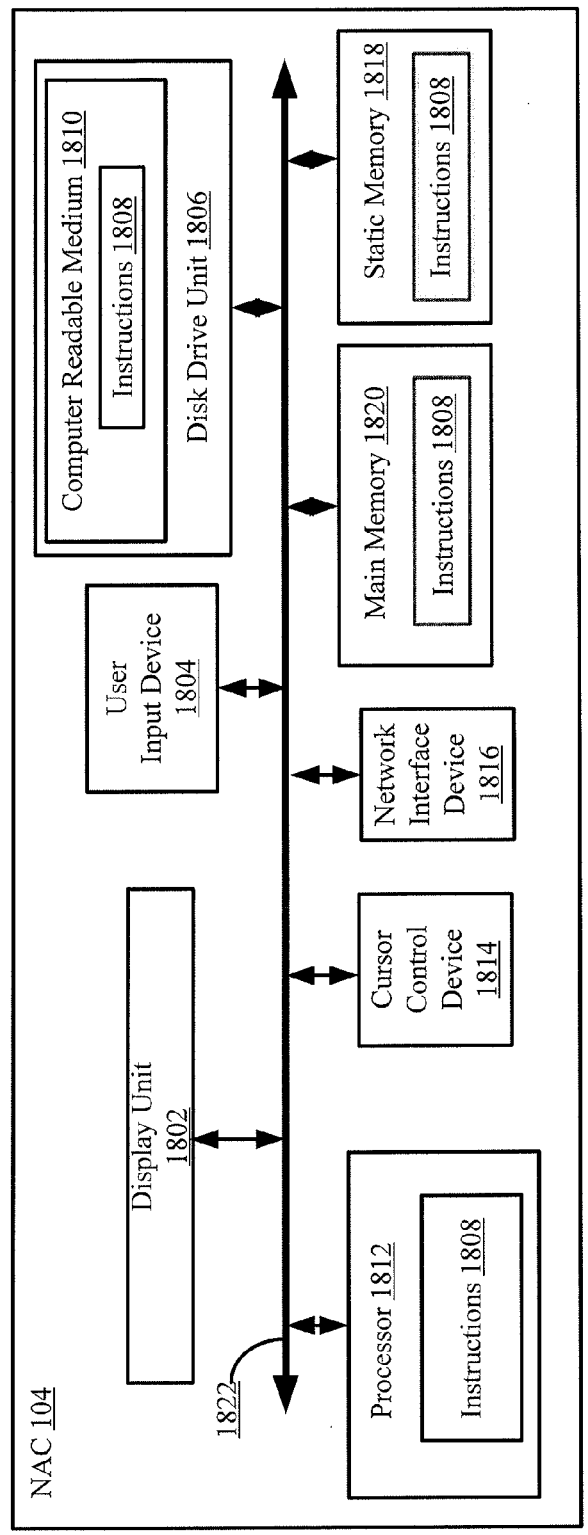
FIG. 18 is a block diagram of a computer architecture that can be used to implement a Network Administration Computer ("NAC") shown in FIG. 1.

Referring now to FIG. 18, there is shown an exemplary NAC 104 in accordance with the inventive arrangements. The NAC 104 can comprise various types of computing systems and devices, including a server computer, a client user computer, a Personal Computer ("PC"), a tablet PC, a laptop computer, a desktop computer, a control system or any other device capable of executing a set of instructions (sequential or otherwise) that specifies actions to be taken by that device. Further, while a single computer is illustrated in FIG. 18, the phrase "NAC" shall be understood to include any collection of computing devices that individually or jointly execute a set (or multiple sets) of instructions to perform any one or more of the methodologies discussed herein.

Referring now to FIG. 18, the NAC 104 includes a processor 1812 (such as a CPU), a disk drive unit 1806, a main memory 1820 and a static memory 1818, which communicate with each other via a bus 1822. The NAC 104 can further include a display unit 1802, such as a video display (e.g., an LCD), a flat panel, a solid state display, or a Cathode Ray Tube ("CRT"). The NAC 104 can include a user input device 1804 (e.g., a keyboard), a cursor control device 1814 (e.g., a mouse) and a network interface device 1816.

The disk drive unit 1806 includes a computer-readable storage medium 1810 on which is stored one or more sets of instructions 1808 (e.g., software code) configured to implement one or more of the methodologies, procedures, or functions described herein. The instructions 1808 can also reside, completely or at least partially, within the main memory 1820, the static memory 1818, and/or within the processor 1812 during execution thereof. The main memory 1820 and the processor 1812 also can constitute machine-readable media.

Those skilled in the art will appreciate that the module architecture illustrated in FIGS. 10-17 and the NAC architecture in FIG. 18, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1810 is shown in FIGS. 10 and 18 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Network State Management

In some scenarios, nodes of a network (e.g., network 100 of FIG. 1) can be managed as discrete components. However, in these scenarios, changing one or more identity parameters associated with discrete components may not (a) minimize an attack surface or (b) reduce a probability of a successful attack. Consequently, the present invention provides solutions for achieving (a) and (b).

Such solutions generally involve viewing a network in a holistic manner, rather than in a discrete component manner. In this regard, the solutions comprise dynamically changing a network state in response to a proactive/reactive trigger event. A network state is defined at least by one or more of sub-network parameters, endpoint configuration parameters, communication profile parameters, network piping configuration parameters, protocol parameters, packet parameters, network noise parameters, and mission plan identification parameters. All but the mission plan identification parameters are well known in the art, and therefore will not be described in detail herein. However, it should be understood that a network state can be changed simply by modifying one or more of the listed parameters. For example, a network state modification can involve changing: a communication protocol employed by network nodes; a number of network nodes that are to use a particular communications protocol; and/or the communication paths that are to be used for facilitating communications between applications running on network nodes.

The manner in which the parameters are changed can be manually done by a network manager or automatically done in accordance with one or more network management plans/rules implemented within the network. Each network management plan/rule can define two or more sub-networks and specify which mission plans the sub-networks are to use when a proactive/reactive trigger event occurs. For example, a network management plan/rule can specify that: network nodes 1-3 comprise a first sub-network; network nodes 4-6 comprise a second sub-network; mission plan A is to be employed by the first sub-network and mission plan B is to be employed by the second sub-network during a duration immediately following a first trigger event (e.g., expiration of a pre-defined time period); and mission plan C is to be employed by the first sub-network and mission plan D is to be employed by the second sub-network during a duration immediately following a second trigger event (e.g., user-software interaction for commanding a network state change).

Figure 19:
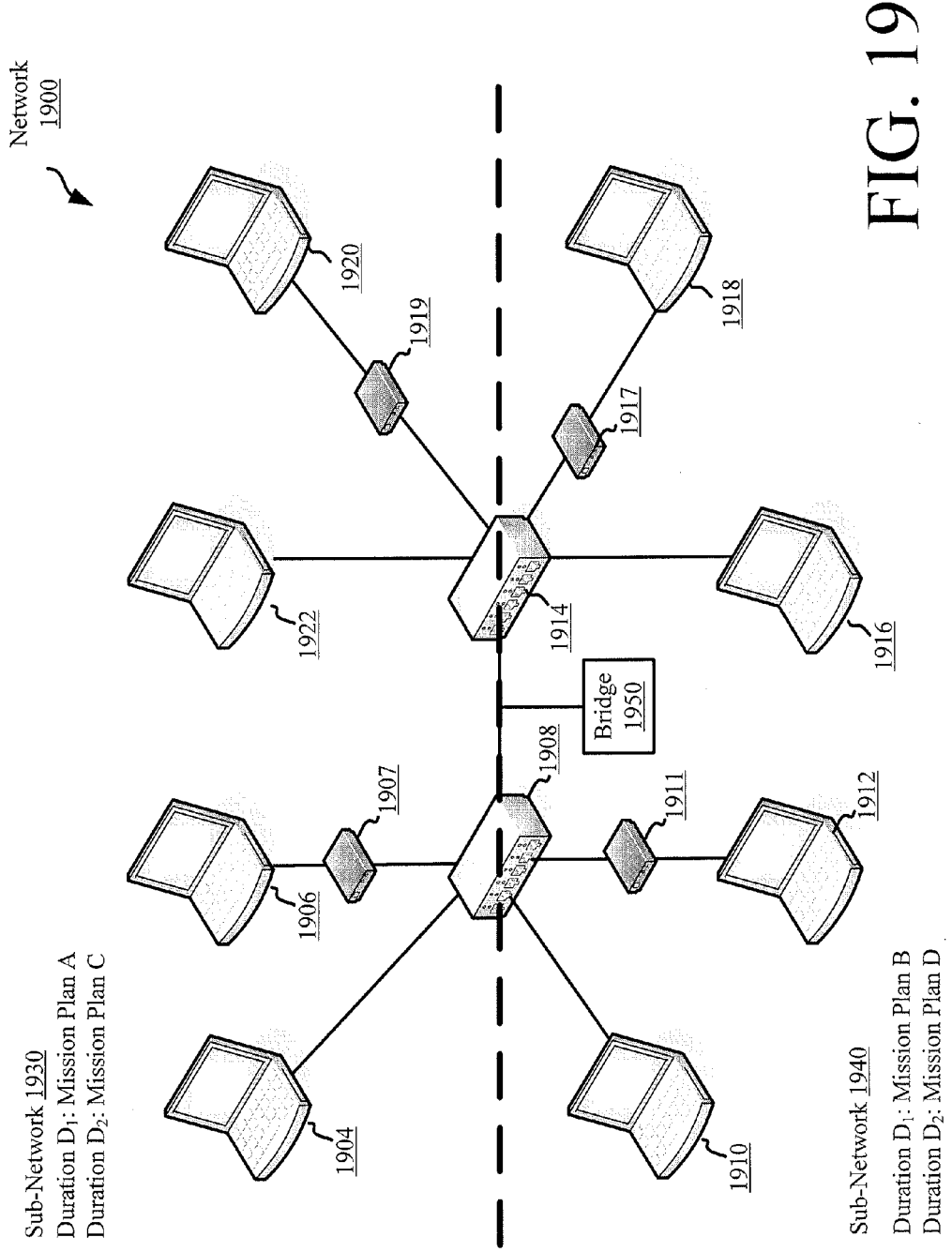
FIGS. 19-21 each provide a schematic illustration of an exemplary network in which a network state can be dynamically changed during operations thereof.

Referring now to FIG. 19, there is provided a schematic illustration of a network 1900 in which its state can be dynamically modified during operation thereof. As shown in FIG. 19, the network 1900 has a bus-like network topology. Embodiments of the present invention are not limited in this regard. For example, the network 1900 can alternatively have a star network topology, a ring network topology or a mesh network topology. In all of these topological scenarios, the network 1900 comprises a plurality of network nodes, such as nodes 1904-1922 shown in FIG. 19. Each of the network nodes 1904, 1906, 1910, 1912, 1916, 1918, 1920, 1922 is the same as or substantially similar to a node 101-104, 111 or 112 of FIG. 1. Similarly, each node 1908, 1914 is the same as or substantially similar to a node 108, 109 of FIG. 1. Likewise, each of the nodes 1907, 1911, 1917, 1919 is the same as or substantially similar to a node 105-107, 113 or 114 of FIG. 1. The description provided above in relation to nodes 101-104, 108, 109, 111-114 is sufficient for understanding nodes 1904-1922.

During operation of the network 1900, the network nodes are configured to define two or more sub-networks 1930, 1940. The sub-networks 1930, 1940 concurrently operate in functionally different manners so as to provide an appearance of two disparate and separate networks, thereby thwarting an adversaries view of the network's 1900 actual physical and functional architecture. For example, during an operational duration $D_1$, network nodes of the sub-network 1930 operate in a functional manner specified by a mission plan A, and network nodes of the sub-network 1940 operate in a different functional manner specified by a mission plan B. In a next operational duration $D_2$, network nodes of the sub-network 1930 operate in a functional manner specified by a mission plan C, and network nodes of the sub-network 1940 operate in a different functional manner specified by a mission plan D. As described above, the mission plans A-D can change in response to proactive/reactive trigger events.

Throughout each duration $D_1$ and $D_2$, the functional topology of the sub-networks 1930, 1940 are selectively determined based on at least one mission plan implemented thereby. The functional topology specifies the manner in which nodes of the sub-networks 1930, 1940 are to be communicatively isolated from each other so as to create an appearance of two disparate and separate networks. In this scenario, the network nodes of sub-network 1940 are unable to bi-directionally communicate with network nodes of sub-network 1930 during operational durations $D_1$ and $D_2$. Therefore, if a first node (e.g., node 1904) operating in accordance with mission plan A pings a second node (e.g., node 1912) operating in accordance with mission model B, then the first node will not receive a response from the second node, and vice versa. Consequently, an adversary is unable to determine the actual physical architecture of the network 1900.

As shown in FIG. 19, a node 1950 of the network 1900 is configures to act as a gateway or network bridge 1950 for communicatively connecting nodes of sub-networks 1930, 1940. As such, the nodes of the sub-networks 1930, 1940 can communicate indirectly with each other via node 1950. Gateways and network bridges are well known in the art, and therefore will not be described herein. However, it should be noted that the gateway or network bridge 1950 may use an LUT to determine which sub-network 1930, 1940 the network nodes belong. In some embodiments, the LUT may be dynamically updated in accordance with sub-network architecture changes. Alternatively, a different node may be used as the gateway or bridge subsequent to a sub-network architecture change. Sub-network architecture changes will be described below.

Although the network 1900 is shown in FIG. 19 as having two static sub-network architectures, embodiments of the present invention are not limited in this regard. For example, the network 1900 can have different sub-network architectures during different operational durations. Such a network configuration is shown in FIGS. 20-21.

Figure 20:
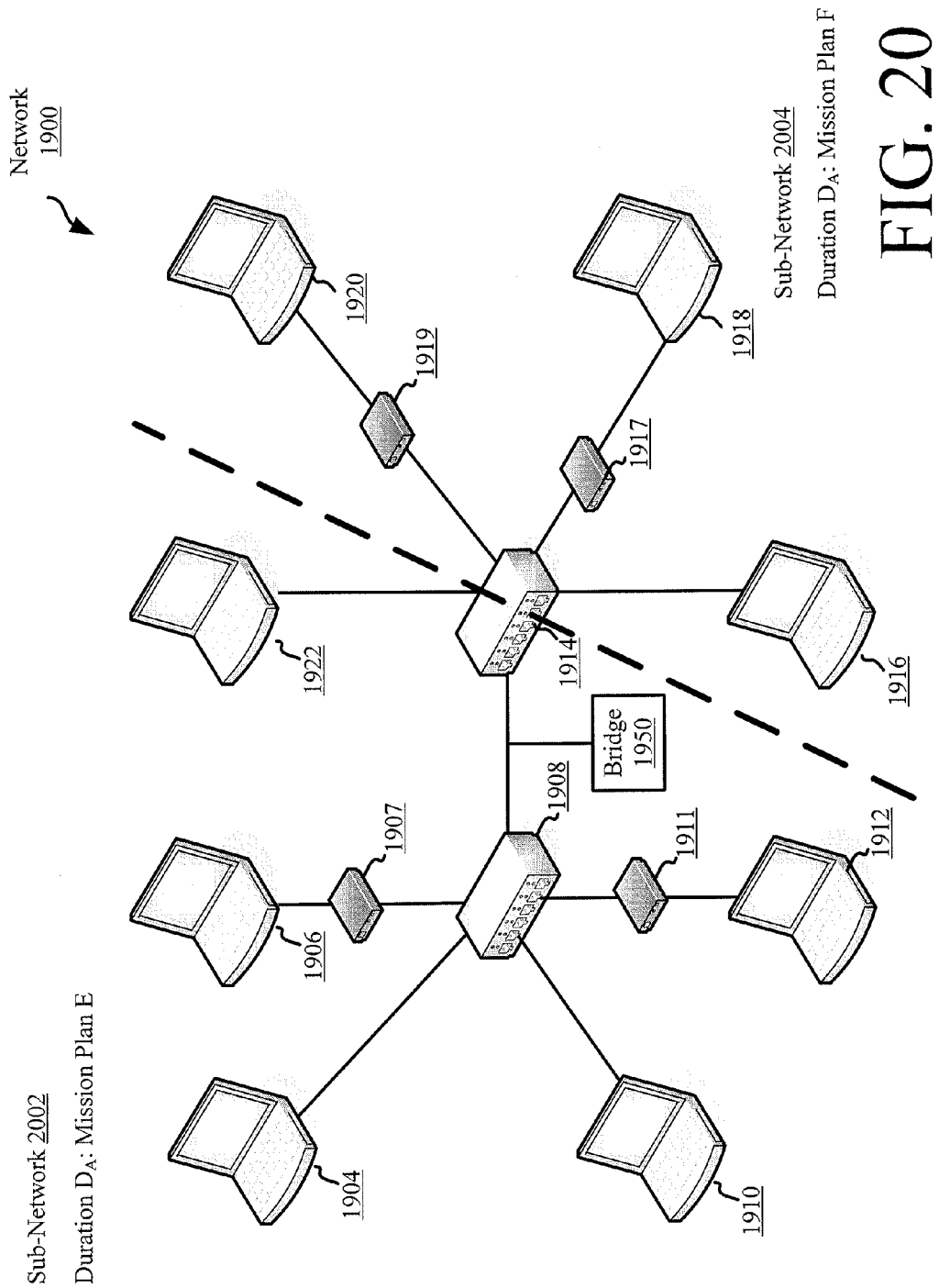

In FIG. 20, the network nodes 1904-1922 are divided into two sub-networks 2002, 2004 during an operational duration $D_A$. Upon the occurrence of a trigger event, the sub-network architecture of network 1900 is changed without physical modification of the network 1900 (i.e., without the addition and/or removal of a physical device). Also, the mission plans E, F employed by the network 1900 are changed to other mission plans. This is schematically illustrated in FIG. 21.

Figure 21:
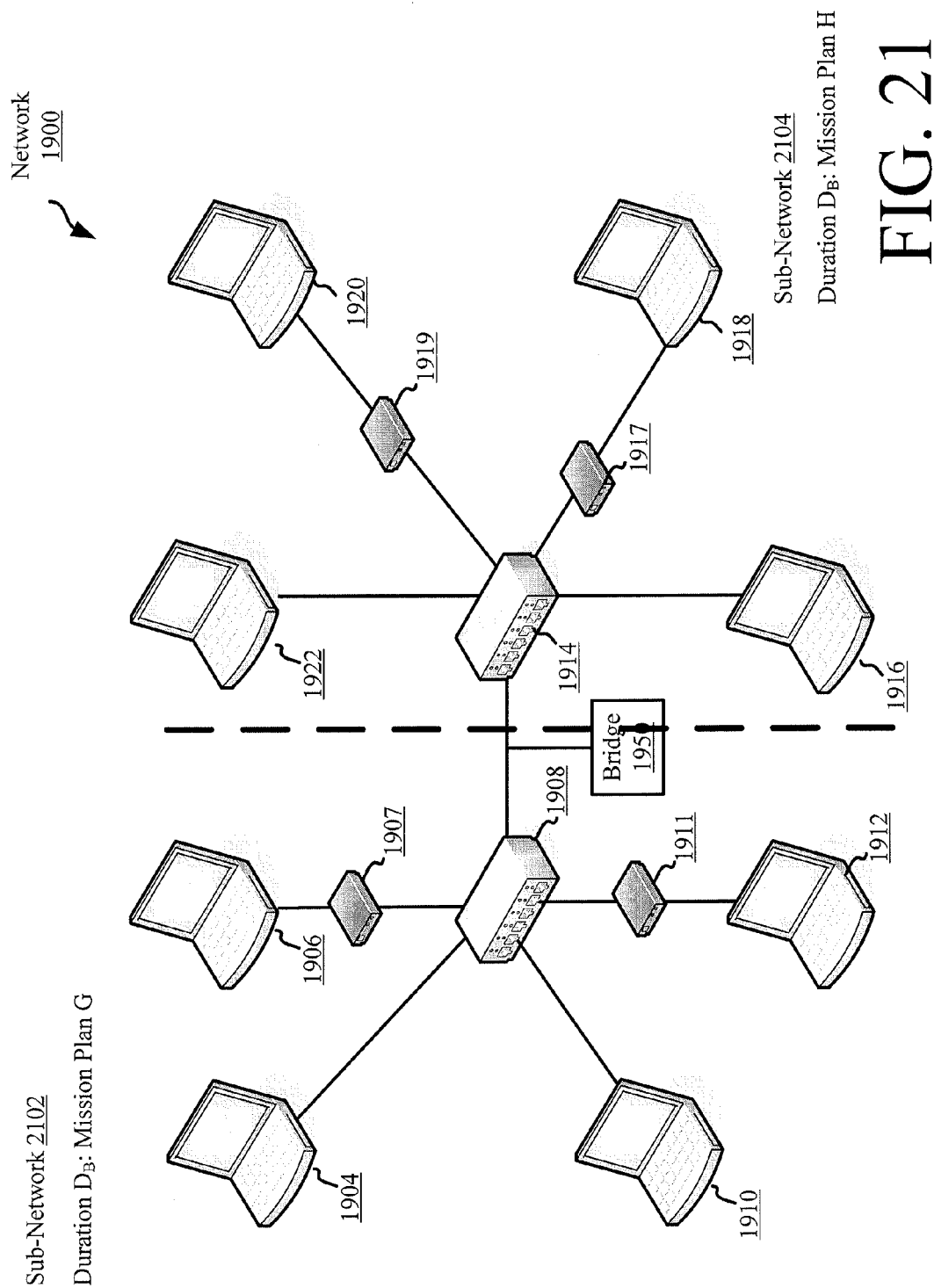

As shown in FIG. 21, the sub-networks 2002, 2004 are switched to sub-networks 2102, 2104 upon the occurrence of a proactive/reactive trigger event. Each of the sub-networks 2102, 2104 comprises a portion of the network nodes contained in sub-networks 2002, 2004 of FIG. 20. More specifically, sub-network 2102 comprises network nodes 1904-1912. Sub-network 2104 comprises network nodes 1914-1922.

Once the sub-networks 2102, 2104 have been set up or simply selected, new mission plans G and H are deployed within the network 1900. Specifically, mission plan G is deployed in sub-network 2102. Mission plan H is deployed in sub-network 2104. The deployment of mission plans can involve: commanding each network node to switch a mission plan E or F to a mission plan G or H; accessing a local data store (not shown) of each network node; reading a mission plan G or H from the local data store (not shown); and executing software at each network node for facilitating an implementation of a mission plan G or H within a sub-network 2102, 2104. Alternatively or additionally, the mission plan deployment can involve: accessing a central data store (not shown) of the network 1900; reading mission plans G and H from the data store; communicating the mission G or H to each node of a respective sub-network 2102, 2104; and executing software at each network node for facilitating an implementation of a mission plan G or H.

Notably, in FIGS. 20-21, the same network node 1950 is utilized as a gateway or bridge during durations $D_A$ and $D_B$. Embodiments of the present invention are not limited in this regard. For example, different network nodes can be used as a gateway or bridge during the durations $D_A$ and $D_B$. The "gateway or bridge" nodes can be selected by a network administrator, in accordance with a network management plan/rule, and/or in accordance with a mission plan.

Figure 22:
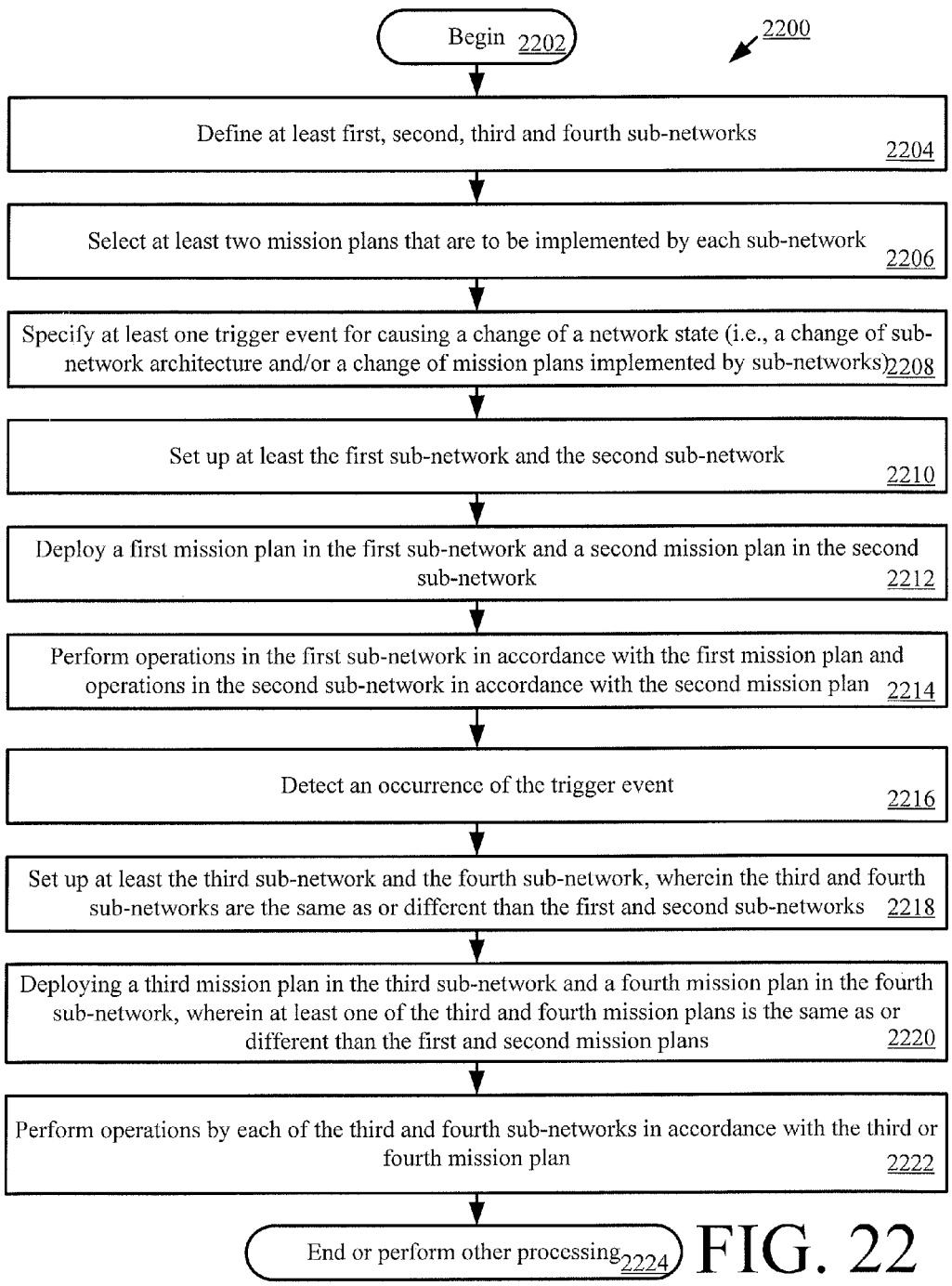
FIG. 22 is a flow diagram of an exemplary method for managing a network state.

Referring now to FIG. 22, there is provided an exemplary method for network state management that is useful for understanding the present invention. As shown in FIG. 22, the method 2200 begins with step 2202 and continues with step 2204. Step 2204 involves defining at least a plurality of sub-networks. The sub-networks can include, but are not limited to, a first sub-network (e.g., sub-network 1930 of FIG. 19 or sub-network 2002 of FIG. 20), a second sub-network (e.g., sub-network 1940 of FIG. 19 or sub-network 2004 of FIG. 20), a third sub-network (e.g., sub-network 2102 of FIG. 21), and a fourth sub-network (e.g., sub-network 2104 of FIG. 21). The sub-networks can be defined in at least one network management plan/rule. The network management plan/rule can be stored in a central data store of a network (e.g., network 1900 of FIG. 19).

After the sub-networks are defined, the method 2200 continues with step 2206 where at least two mission plans are selected for implementation by each sub-network. For example, a mission plan A, C and/or E is(are) selected for implementation by the first sub-network (e.g., sub-network 1930 of FIG. 19 or sub-network 2002 of FIG. 20). A mission plan B, D and/or F is(are) selected for implementation by the second sub-network (e.g., sub-network 1940 of FIG. 19 or sub-network 2004 of FIG. 20). A mission plan G is selected for implementation of the third sub-network (e.g., sub-network 2102 of FIG. 21). A mission plan H is selected for implementation of the fourth sub-network (e.g., sub-network 2104 of FIG. 21). The mission plans can be identified in the network management plan/rule so as to be associated with respective sub-networks.

In a next step 2208, at least one trigger event is specified for causing a change of a network state (i.e., a change of a sub-network architecture and/or a change of mission plans implemented by sub-networks). The trigger event can include, but is not limited to, the proactive trigger events and reactive trigger events described above. For example, the trigger event can include a user-software interaction commanding a network state change or an expiration of a pre-defined period of time (e.g., twenty-four hours) since a last network state change. The trigger event can be specified in the network management plan/rule as indicating when a network state is to be changed and what parameters should be modified for causing said network state change. Such parameters can include, but are not limited to, sub-network parameters, endpoint configuration parameters, communication profile parameters, network piping configuration parameters, protocol parameters, packet parameters, network noise parameters, and/or mission plan identification parameters. Each of the listed parameters is well known in the art, and therefore will not be described in detail herein.

Upon completing step 2208, step 2210 is performed where at least the first sub-network and the second sub-network are set up within the network (e.g., network 1900 of FIG. 19). Methods for setting up sub-networks are well known in the art, and therefore will not be described herein. Any such known or to be known method for setting up a sub-network can be used with the present invention without limitation.

Next, in step 2212, a first mission plan is deployed in the first sub-network, and a second mission plan is deployed in the second sub-network. The first and second mission plans can be deployed in accordance with the network management plan/rule. The deployment of the mission plans can involve: commanding the network nodes of the first sub-network to implement the first mission plan (e.g., mission plan A of FIG. 19 or mission plan E of FIG. 20); commanding the network nodes of the second sub-network to implement the second mission plan (e.g., mission plan B of FIG. 19 or mission plan F of FIG. 20); performing operation by each of the network nodes to access a local data store and read the first or second mission plan therefrom; and executing software at each network node for facilitating an implementation of the first or second mission plan. Alternatively or additionally, the mission plan deployments can involve: performing actions by a network administrative computer to access a central data store of the network and read the first and second mission plans therefrom; communicating the first mission plan to each node of the first sub-network and the second mission plan to each node of the second sub-network; and executing software at each network node for facilitating an implementation of the first or second mission plan.

Subsequent to deploying the first and second mission plans in the network, operations are performed by the first and second sub-networks in accordance with the first and second mission plans, as shown by step 2214. During operations of the first and second sub-networks, a trigger event is detected in step 2216. The trigger event can include, but is not limited to, the proactive trigger event and/or the reactive trigger events described above. In response to the detection of the trigger event, the method 2200 continues with steps 2218-2220 for changing a state of the network.

Step 2218 involves setting up at least the third and fourth sub-networks without physically modifying the network (e.g., network 1900 of FIG. 19). Each of the third and fourth sub-networks can be the same as or different than one of the first and second sub-networks. As noted above, methods for setting up sub-networks are well known in the art, and therefore will not be described herein. Any such known or to be known method can be used in step 2218 without limitation.

Step 2220 involves deploying a third mission plan in the third sub-network and a fourth mission plan in the fourth sub-network. Each of the third and fourth mission plans is the same as or different than the first and second mission plans. Thereafter, operations are performed in step 2222 by each of the third and fourth sub-networks in accordance with the third or fourth mission plan. In a next step 2224, the method 2200 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for use in a computer network, comprising:
performing operations by a first sub-network of said computer network in accordance with a first mission plan specifying a first process for pseudo-randomly modifying at least one first identity parameter associated with at least one first computing device of said computer network to specify false information;
performing operations by a second sub-network of said computer network in accordance with a second mission plan specifying a second process for pseudo-randomly modifying at least one second identity parameter associated with at least one second computing device of said computer network to specify false information, said second mission plan being different than said first mission plan;
selectively determining a functional topology of at least one of said first and second sub-networks based on at least one of said first and second mission plans, said functional topology specifying a manner in which nodes of said first sub-network are to be communicatively isolated from nodes of said second sub-network creating an appearance of two disparate and separate networks;

detecting a first event for triggering a change in a state of said computer network; and in response to the detection of said first event, dynamically and automatically changing a functional topology of said first and second sub-networks by modifying at least one of a number of sub-networks of said computer network and reassigning at least one node defining at least one of said first and second sub-networks to another sub-network of said computer network exclusively by performing logical operations within the computer network, wherein said first and second sub-networks are set up without physical modification of said computer network.

2. The method according to claim 1, wherein said state is modified by changing a mission plan implemented by said computer network.

3. The method according to claim 1 further comprising setting up a third sub-network and a fourth sub-network that are each different than said first and second sub-networks.

4. The method according to claim 3, further comprising performing operations by said third sub-network in accordance with a third mission plan and said fourth sub-network in accordance with a fourth mission plan, at least one of said third and fourth mission plans is different than said first and second mission plans.

5. The method according to claim 1, wherein said first event comprises a user-software interaction commanding a change of said state or an expiration of a pre-defined period of time.

6. The method according to claim 1, wherein said state is changed by modifying at least one of a sub-network parameter, an endpoint configuration parameter, a communication profile parameter, a network piping configuration parameter, a protocol parameter, a packet parameter, and a network noise parameter.

7. The method according to claim 1, further comprising configuring at least one first network node of said computer network to act as a gateway or bridge between said first and second sub-networks.

8. The method according to claim 7, wherein said first network node is specified to act as a gateway or bridge in at least one of said first and second mission plans.

9. The method according to claim 7, further comprising performing the following acts in response to the detection of said first event:
re-configuring said first network device so that it does not act as said gateway or bridge; and
configuring a second different network device to act as a gateway or bridge between newly set up sub-networks.

10. A system, comprising:
a network of network nodes comprising
a first sub-network performing operations in accordance with a first mission plan specifying a first process for pseudo-randomly modifying at least one first identity parameter associated with at least one first computing device of said computer network to specify false information, a second sub-network performing operations by a second sub-network of said computer network in accordance with a second mission plan specifying a second process for pseudo-randomly modifying at least one second identity parameter associated with at least one second computing device of said computer network to specify false information, said second mission plan being different than said first mission plan; and a computing device detecting a first event for triggering a change in a state of said computer network;

wherein a functional topology of at least one of said first and second sub-networks is selectively determined based on at least one of said first and second mission plans, said functional topology specifying a manner in which nodes of said first sub-network are to be communicatively isolated from nodes of said second sub-network creating an appearance of two disparate and separate networks;

wherein at least one of a number of sub-networks of said computer network and an assignment of at least one node to at least one of said first and second sub-networks of said computer network are dynamically and automatically changed exclusively by performing logical operations by the computer network in response to the detection of the first event; and wherein said first and second sub-networks are set up without physical modification of said computer network.

11. The system according to claim 10, wherein said state is modified by changing a mission plan implemented by said computer network.

12. The system according to claim 10, wherein said state is modified by changing a sub-network architecture of said computer network without physical modification of said computer network.

13. The system according to claim 12, wherein said sub-network architecture is changed by setting up a third sub-network and a fourth sub-network that are each different than said first and second sub-networks.

14. The system according to claim 13, further comprising performing operations by said third sub-network in accordance with a third mission plan and said fourth sub-network in accordance with a fourth mission plan, at least one of said third and fourth mission plans is different than said first and second mission plans.

15. The system according to claim 10, wherein said first event comprises a user-software interaction commanding a change of said state or an expiration of a pre-defined period of time.

16. The system according to claim 10, wherein said state is changed by modifying at least one of a sub-network parameter, an endpoint configuration parameter, a communication profile parameter, a network piping configuration parameter, a protocol parameter, a packet parameter, and a network noise parameter.

17. The system according to claim 10, further comprising a first network device communicatively connecting said first and second sub-networks.

* * * * *